US011257077B2

(12) United States Patent
Agrawal et al.

(10) Patent No.: US 11,257,077 B2
(45) Date of Patent: Feb. 22, 2022

(54) BLOCKCHAIN SYSTEM FOR CONFIDENTIAL AND ANONYMOUS SMART CONTRACTS

(71) Applicants: Visa International Service Association, San Francisco, CA (US); The Board of Trustees of the Leland Stanford Junior University, Stanford, CA (US)

(72) Inventors: Shashank Agrawal, Mountain View, CA (US); Karl Benedikt Bünz, Palo Alto, CA (US); Mahdi Zamani, Palo Alto, CA (US); Dan Boneh, Stanford, CA (US)

(73) Assignees: Visa International Service Association, San Francisco, CA (US); The Board of Trustees of the Leland Stanford Junior University, Stanford, CA (US)

( * ) Notice: Subject to any disclaimer, the term of this patent is extended or adjusted under 35 U.S.C. 154(b) by 236 days.

(21) Appl. No.: 16/206,661

(22) Filed: Nov. 30, 2018

(65) Prior Publication Data
US 2019/0164153 A1    May 30, 2019

Related U.S. Application Data

(60) Provisional application No. 62/593,154, filed on Nov. 30, 2017.

(51) Int. Cl.
*G06Q 20/38* (2012.01)
*H04L 9/06* (2006.01)
(Continued)

(52) U.S. Cl.
CPC ....... *G06Q 20/383* (2013.01); *G06Q 20/0658* (2013.01); *G06Q 20/3678* (2013.01);
(Continued)

(58) Field of Classification Search
None
See application file for complete search history.

(56) References Cited

U.S. PATENT DOCUMENTS

| 2003/0093667 A1* | 5/2003 | Dutta | G06Q 20/32 713/161 |
| 2012/0066107 A1* | 3/2012 | Grajetzki | G06Q 20/32 705/35 |

(Continued)

FOREIGN PATENT DOCUMENTS

| CN | 106549749 | 3/2017 |
| CN | 106845960 A | 6/2017 |
| EP | 3323080 B1 * | 11/2020 ............... G09C 1/00 |

OTHER PUBLICATIONS

Hughes, Sarah Jane ; Middlebrook, Stephen T, Advancing a framework for regulating cryptocurrency payments intermediaries, Yale journal on regulation, Jun. 22, 2015, vol. 32 (2), p. 495.*

(Continued)

*Primary Examiner* — Isidora I Immanuel
(74) *Attorney, Agent, or Firm* — Kilpatrick Townsend & Stockton LLP

(57) ABSTRACT

Blockchain-based, smart contract platforms have great promise to remove trust and add transparency to distributed applications. However, this benefit often comes at the cost of greatly reduced privacy. Techniques for implementing a privacy-preserving smart contract is described. The system can keep accounts private while not losing functionality and with only a limited performance overhead. This is achieved by building a confidential and anonymous token on top of a cryptocurrency. Multiple complex applications can also be built using the smart contract system.

17 Claims, 9 Drawing Sheets

(51) Int. Cl.
*G06Q 20/36* (2012.01)
*G06Q 20/06* (2012.01)
*H04L 9/32* (2006.01)
*H04L 9/00* (2006.01)

(52) U.S. Cl.
CPC ............ *H04L 9/008* (2013.01); *H04L 9/0637* (2013.01); *H04L 9/3218* (2013.01); *H04L 9/3239* (2013.01); *H04L 2209/38* (2013.01); *H04L 2209/56* (2013.01)

(56) References Cited

U.S. PATENT DOCUMENTS

| | | |
|---|---|---|
| 2013/0339252 A1 | 12/2013 | Pauker et al. |
| 2016/0342977 A1 | 11/2016 | Lam |
| 2017/0154331 A1 | 6/2017 | Shapeshift |
| 2017/0155515 A1 | 6/2017 | Androulaki et al. |
| 2017/0338947 A1 | 11/2017 | Ateniese et al. |
| 2019/0028277 A1* | 1/2019 | Jayachandran ......... H04L 9/085 |
| 2019/0156301 A1* | 5/2019 | Bentov ................ G06Q 20/389 |

OTHER PUBLICATIONS

International Search Report and Written Opinion, dated Mar. 21, 2019, in PCT Application No. PCT/S2018/063419, 11 pages.
Application No. EP18884762.8, Extended European Search Report, dated Dec. 23, 2020, 8 pages.

* cited by examiner

Setup

INPUT: Security parameter $\lambda$ (in unary)

1. $(p, g, \mathbb{G}) \leftarrow \text{GroupGen}(1^\lambda)$
2. $\text{pp}_\pi \leftarrow \text{Setup}_\pi(1^\lambda)$
3. $\text{pp}_{\text{sig}} \leftarrow \text{Setup}_{\text{sig}}(1^\lambda)$
4. Initialize
   - empty account table, $\text{acc} : \mathbb{G} \rightarrow \mathbb{G}^2$
   - empty pending transfers table, $\text{pTransfers} : \mathbb{G} \rightarrow \mathbb{G}^2$
   - an empty last roll over epoch table, $\text{lastRollOver} : \mathbb{G} \rightarrow \mathbb{Z}$,
   - an empty lock table, $\text{lock} : \mathbb{G} \rightarrow \{0,1\}^*$,
   - an empty pending lock table, $\text{pLock} : \mathbb{G} \rightarrow \{0,1\}^*$,
   - an empty nonce set, $\mathcal{U} = \emptyset$,
   - total balance $b_{\text{total}} \in \mathbb{Z}$ to 0,
   - global last update in epochs $t \in \mathbb{Z}$ to 0,
   - first epoch base $g_{\text{epoch}} \in \mathbb{G}$ to $\mathcal{H}(\text{Zether}\|0)$, where $\mathcal{H}$ is a hash function.
5. Deploy smart contract ZSC (Figure 2) with parameters $(p, g, \mathbb{G}), \text{pp}_\pi, \text{pp}_{\text{sig}}$, acc, pTransfers, lastRollOver, lock, pLock, $\mathcal{U}$, $b_{\text{total}}$, $t$, $g_{\text{epoch}}$, MAX, E.

FIG. 5

Fund
- INPUTS: public key $y$
1. RollOver($y$)
2. Let $b$ = msg.value
3. require:
   - $b + b_{total} \leq$ MAX
   - CheckLock($y$, msg.sender) = 1
4. If acc[$y$] = $\perp$:
   - Let $H$ = block.number, $e = \lceil H/E \rceil$
   - Set acc[$y$] = (1, 1)
   - Set pTransfers[$y$] = ($g^b$, 1)
   - Set lock[$y$] = pLock[$y$] = $\perp$
   - Set lastRollOver[$y$] = $e$
   Else:
   - Set pTransfers[$y$] = pTransfers[$y$] ∘ ($g^b$, 1)
5. Set $b_{total} = b_{total} + b$

Transfer
- INPUTS:
  - set of public keys $\mathbf{y} = \{y_1, \ldots, y_n\}$
  - ciphertexts $(C_1, D), (C_2, D), \ldots, (C_n, D)$
  - nonce $u$
  - proof $\pi_{transfer}$
1. For each $i \in [1, n]$:
   a. RollOver($y_i$)
   b. Let $(C_{L,i}, C_{R,i})$ = acc[$y_i$]
2. Let $\mathbf{C} = \{C_1, \ldots, C_n\}$
3. require:
   - $u \notin \mathcal{U}$
   - CheckLock($y_i$, msg.sender) = 1 for $i \in [1, n]$
   - Verify$_{zksk}$(st$_{AnonTransfer}$[$\mathbf{y}, \mathbf{C}, D$, $(C_{L,i}, C_{R,i})_{i=1}^n, u, g, \mathcal{G}_{epoch}$], $\pi_{transfer}$) = 1
4. Set $\mathcal{U} = \mathcal{U} \cup \{u\}$
5. For each $i \in [1, n]$, set
   pTransfers[$y_i$] = pTransfers[$y_i$] ∘ ($C_i, D$)

Lock
- INPUTS:
  - public key $y$
  - Ethereum address addr
  - signature $\sigma_{lock}$
1. RollOver($y$)
2. require:
   - CheckLock($y$, msg.sender) = 1
   - Verify$_{sig}$($y$, (addr, $\mathcal{G}_{epoch}$), $\sigma_{lock}$) = 1
3. Set pLock[$y$] = addr

Burn
- INPUTS:
  - public key $y$
  - balance $b$
  - nonce $u$
  - proof $\pi_{burn}$
1. RollOver($y$)
2. Let $(C_L, C_R)$ = acc[$y$]
3. require:
   - $u \notin \mathcal{U}$
   - CheckLock($y$, msg.sender) = 1
   - Verify$_{zksk}$(st$_{burn}$[$y, C_L, C_R, u, b, g, \mathcal{G}_{epoch}$], $\pi_{burn}$) = 1
4. Set $\mathcal{U} = \mathcal{U} \cup \{u\}$
5. Set acc[$y$] = acc[$y$] ∘ ($C_L^{-1}, C_R^{-1}$)
6. Set $b_{total} = b_{total} - b$
7. Do msg.sender.transfer($b$)

Unlock
- INPUTS: public key $y$
1. RollOver($y$)
2. require:
   - CheckLock($y$, msg.sender) = 1
3. Set pLock[$y$] = $\perp$

*Internal Helper Methods*

RollOver
- INPUTS: public key $y$
1. Let $H$ = block.number, $e = \lceil H/E \rceil$
2. If lastRollOver[$y$] < $e$:
   - Set acc[$y$] = acc[$y$] ∘ pTransfers[$y$]
   - Set pTransfers[$y$] = (1, 1)
   - Set lock[$y$] = pLock[$y$]
   - Set lastRollOver[$y$] = $e$
3. If $t < e$:
   - Set $\mathcal{G}_{epoch}$ = $\mathcal{H}$(Zether||$e$)
   - Set $\mathcal{U} = \emptyset$
   - Set $t = e$

CheckLock
- INPUTS:
  - public key $y$
  - Ethereum address addr
- OUTPUT: 1 if account $y$ can be operated by addr; 0 otherwise
1. If lock[$y$] = $\perp$ or lock[$y$] = addr:
   - Output 1
   Else:
   - Output 0

FIG. 6

CreateAddress
- INPUTS: $1^\lambda$
- OUTPUT: $x \in \mathbb{Z}_p, y \in \mathbb{G}$
1. $x \xleftarrow{\$} \mathbb{Z}_p$
2. $y = g^x$ CreateTransferTx
- INPUTS:
  - shuffled anonymity set $y = \{y_1, \ldots, y_n\}$ which includes sender and receiver
  - sender index $i_{from}$
  - receiver index $i_{to}$
  - sender private key $x$
  - sender balance $b_{from}$
  - transfer amount $b^*$
  - state $st_h$ of ZSC
- OUTPUT: $tx_{trans} = (y, C, D, u, \pi_{transfer})$
1. Roll over all $y_i$ in $st_h$
2. Let $(C_{L,i}, C_{R,i}) = acc[y_i]$ for $i \in [n]$
3. $r \xleftarrow{\$} \mathbb{Z}_p$
4. Set $C_{i_{from}} = g^{b^*} y_{i_{from}}^r$
5. Set $C_{i_{to}} = g^{b^*} y_{i_{to}}^r$
6. Set $C_i = y_i^r$ for $i \in [n] \setminus \{i_{from}, i_{to}\}$
7. Set $C = \{C_1, \ldots, C_n\}$ and $D = g^r$
8. Set $s_{i_{from}} = 1$ and $s_i = 0$ for $i \in [n] \setminus \{i_{from}\}$
9. Set $t_{i_{to}} = 1$ and $t_i = 0$ for $i \in [n] \setminus \{i_{to}\}$
10. Set $u = g^x_{epoch}$
11. Set $w = (x, b^*, b_{from} - b^*, r, (s_i, t_i)_{i=1}^n)$
12. $\pi_{transfer} =$ Prove($st_{AnonTransfer}[y, C, D, (C_{L,i}, C_{R,i})_{i=1}^n, u, g, g_{epoch}], w$)

CreateBurnTx
- INPUTS:
  - private key $x$
  - state $st_h$ of ZSC
- OUTPUT: $tx_{burn} = (y, b, u, \pi_{burn})$
1. Let $b =$ ReadBalance($x, st_h$)
2. $u = g^x_{epoch}$
3. $w = (x)$
4. Set $y = g^x$
5. Let $(C_L, C_R) = acc[y]$
6. $\pi_{burn} =$ Prove($st_{burn}[y, C_L, C_R, u, b, g, g_{epoch}], w$)

CreateLockTx
- INPUTS:
  - private key $x$
  - locking Ethereum address addr
  - state $st_h$ of ZSC
- OUTPUT: $tx_{lock} = (y, addr, \sigma_{lock})$
1. Compute $\sigma_{lock} =$ Sign($x, (addr, g_{epoch})$)
2. Set $y = g^x$ ReadBalance
- INPUTS:
  - private key $x$
  - state $st_h$ of ZSC
- OUTPUT: balance $b$
1. Set $y = g^x$
2. Roll over $y$ in $st_h$
3. $(C_L, C_R) = acc[y]$
4. Find $b$ s.t. $C_L/C_R^x = g^b$

FIG. 7

Fund
- INPUTS: public key $y$
1. RollOver($y$)
2. Let $b = $ msg.value
3. require:
   - $b + b_{total} \leq $ MAX
   - CheckLock($y$, msg.sender) $= 1$
4. If acc[$y$] $= \bot$:
   - Let $H = $ block.number, $e = \lfloor H/E \rfloor$
   - Set acc[$y$] $= (1,1)$
   - Set pTransfers[$y$] $= (g^b, 1)$
   - Set lock[$y$] $= \bot$
   - Set lastRollOver[$y$] $= e$
   - Set ctr[$y$] $= 0$
   Else:
   - Set pTransfers[$y$] $= $ pTransfers[$y$] $\circ (g^b, 1)$
5. Set $b_{total} = b_{total} + b$ Transfer
- INPUTS:
   - sender address $y$
   - recipient address $\bar{y}$
   - ciphertexts $(C, D), (\bar{C}, D)$
   - proof $\pi_{transfer}$
   - signature $\sigma_{transfer}$
1. RollOver($y$)
2. Let $(C_L, C_R) = $ acc[$y$]
3. require:
   - CheckLock($y$, msg.sender) $= 1$
   - Verify$_{zk}$(st$_{ConfTransfer}$[$y, \bar{y}, C_L, C_R, C, \bar{C}, D$], $\pi_{transfer}$) $= 1$
   - Verify$_{sig}$($y, (\bar{y}, C, \bar{C}, D, \pi_{transfer}, $ ctr[$y$]), $\sigma_{transfer}$) $= 1$
4. Set acc[$y$] $= $ acc[$y$] $\circ (C^{-1}, D^{-1})$
5. Set pTransfers[$\bar{y}$] $= $ pTransfers[$\bar{y}$] $\circ (\bar{C}, D)$
6. Set ctr[$y$] $= $ ctr[$y$] $+ 1$ Lock
- INPUTS:
   - public key $y$
   - Ethereum address addr
   - signature $\sigma_{lock}$
1. RollOver($y$)
2. require:
   - CheckLock($y$, msg.sender) $= 1$
   - Verify$_{sig}$($y, ($addr, ctr[$y$]), $\sigma_{lock}$) $= 1$
3. Set lock[$y$] $= $ addr
4. Set ctr[$y$] $= $ ctr[$y$] $+ 1$ Burn
- INPUTS:
   - public key $y$
   - balance $b$
   - proof $\pi_{burn}$
   - signature $\sigma_{burn}$
1. RollOver($y$)
2. Let $(C_L, C_R) = $ acc[$y$]
3. require:
   - CheckLock($y$, msg.sender) $= 1$
   - Verify$_{zk}$(st$_{burn}$[$y, C_L, C_R, b, g$], $\pi_{burn}$) $= 1$
   - Verify$_{sig}$($y, (b, \pi_{burn}, $ ctr[$y$]), $\sigma_{burn}$) $= 1$
4. Set acc[$y$] $= $ acc[$y$] $\circ (C_L^{-1}, C_R^{-1})$
5. Set ctr[$y$] $= $ ctr[$y$] $+ 1$
6. Set $b_{total} = b_{total} - b$
7. Do msg.sender.transfer($b$)

Unlock
- INPUTS: public key $y$
1. RollOver($y$)
2. require:
   - CheckLock($y$, msg.sender) $= 1$
3. Set lock[$y$] $= \bot$

*Internal Helper Methods*

RollOver
- INPUTS: public key $y$
1. Let $H = $ block.number, $e = \lfloor H/E \rfloor$
2. If lastRollOver[$y$] $< e$:
   - Set acc[$y$] $= $ acc[$y$] $\circ $ pTransfers[$y$]
   - Set pTransfers[$y$] $= (1,1)$
   - Set lastRollOver[$y$] $= e$

FIG. 8

CreateTransferTx
- INPUTS:
  - sender public key $y$
  - receiver public key $\bar{y}$
  - sender private key $x$
  - sender balance $b_{from}$
  - transfer amount $b^*$
  - state $st_h$ of ZSC
- OUTPUT: $tx_{trans} = (y, \bar{y}, C, \overline{C}, D, \pi_{transfer}, \sigma_{transfer})$
1. Roll over $y$ in $st_h$
2. Let $(C_L, C_R) = acc[y]$
3. $r \xleftarrow{\$} \mathbb{Z}_p$
4. Set $C = g^{b^*} y^r$
5. Set $\overline{C} = g^{b^*} \bar{y}^r$
6. Set $D = g^r$
7. Set $w = (x, b^*, b_{from}, r)$
8. $\pi_{transfer} =$
   Prove($st_{ConfTransfer}[y, \bar{y}, C_L, C_R, C, \overline{C}, D, g], w$)
9. $\sigma_{transfer} =$
   Sign($x, (\bar{y}, C, \overline{C}, D, \pi_{transfer}, ctr[y])$)

CreateBurnTx
- INPUTS:
  - private key $x$
  - state $st_h$ of ZSC
- OUTPUT: $tx_{burn} = (y, b, \pi_{burn}, \sigma_{burn})$
1. Let $b =$ ReadBalance($x, st_h$)
2. $w = (x)$
3. Set $y = g^x$
4. Let $(C_L, C_R) = acc[y]$
5. $\pi_{burn} =$ Prove($st'_{burn}[y, C_L, C_R, b, g], w$)
6. $\sigma_{burn} =$ Sign($x, (b, \pi_{burn}, ctr[y])$)

CreateLockTx
- INPUTS:
  - private key $x$
  - locking Ethereum address addr
  - state $st_h$ of ZSC
- OUTPUT: $tx_{lock} = (y, addr, \sigma_{lock})$
1. Compute $\sigma_{lock} =$ Sign($x, (addr, ctr[y])$)
2. Set $y = g^x$

FIG. 9

BLOCKCHAIN SYSTEM FOR CONFIDENTIAL AND ANONYMOUS SMART CONTRACTS

CROSS-REFERENCES TO RELATED APPLICATIONS

This application claims the benefit of priority to U.S. Provisional Application No. 62/593,154, filed on Nov. 30, 2017, which is hereby incorporated by reference in its entirety for all purposes.

This invention was made with Government support under contract 1228648 awarded by the National Science Foundation. The Government has certain rights in the invention.

BACKGROUND

Cryptocurrencies such as Bitcoin and Ethereum use a distributed ledger, known as a blockchain, to record all transactions. The transactions can be verified and extended by any entity, making them open and transparent. The same openness, however, comes with a significant privacy cost. Not only are the transaction amounts fully visible in the clear but users can also be de-anonymized. The unspent transaction output (UTXO) model employed by cryptocurrencies such as Bitcoin is also not well-suited for applications that are more complex than asset issuance and transfer. Thus, UTXO-based cryptocurrencies such as Bitcoin may have limited applicability beyond basic value transfers.

Embodiments of the present invention address these and other problems individually and collectively.

BRIEF SUMMARY

Techniques for implementing confidential and anonymous token transfer in a blockchain system may include storing a set of entries representing a state of a platform smart contract in a blockchain network. The set of entries may including at least a first entry comprising a first public key associated with a first account, and a first ciphertext representing a first balance of the first account; a second entry comprising a second public key associated with a second account, and a second ciphertext representing a second balance of the second account; and a third entry comprising a third public key associated with a third account, and a third ciphertext representing a third balance of the third account. A transaction can be conducted to cause the first balance to be decremented by a first amount and the second balance to be incremented by a second amount. To achieve confidentiality by hiding the transfer amount, the first ciphertext can be updated by adding a first operand ciphertext to the first ciphertext, the first operand ciphertext being generated by encrypting a negative of the first amount using the first public key. The second ciphertext can be updated by adding a second operand ciphertext to the second ciphertext, the second operand ciphertext being generated by encrypting the second amount using the second public key. To achieve anonymity by hiding the transacting parties, in addition to updating the first and second ciphertexts, the third ciphertext can be updated by adding a third operand ciphertext to the third ciphertext, the third operand ciphertext being generated by encrypting zero using the third public key In some embodiments, to support more complex functions, the platform smart contract may lock multiple accounts (e.g., the first, second, and third accounts) to an application smart contract. The application smart contract may implement functions such as a sealed-bid auction, a confidential payment channel, a stake voting, or a proof-of-stake smart contract. The application smart contract can be executed to perform its underlying functions resulting in one or more transactions to be performed on the locked accounts. The application smart contract may then unlock the accounts from the application smart contract, and the ciphertexts of the accounts can be updated similarly as above to achieve confidentially and anonymity.

According to some embodiments, a computing system may include a processor, and a memory storing executable instructions, which when executed by the processor, causes the computing system to perform the above operations.

BRIEF DESCRIPTION OF THE DRAWINGS

FIG. 5 illustrates the set-up algorithm for platform smart contract, according to some embodiments.

FIG. 6 illustrates system algorithms implemented in a platform smart contract supporting confidentiality and anonymity, according to some embodiments.

FIG. 7 illustrates user algorithms used to interact with a platform smart contract supporting confidentiality and anonymity, according to some embodiments.

FIG. 8 illustrates system algorithms implemented in a platform smart contract supporting confidentiality, according to some embodiments.

FIG. 9 illustrates user algorithms used to interact with a platform smart contract supporting confidentiality, according to some embodiments.

DETAILED DESCRIPTION

Figure 1:
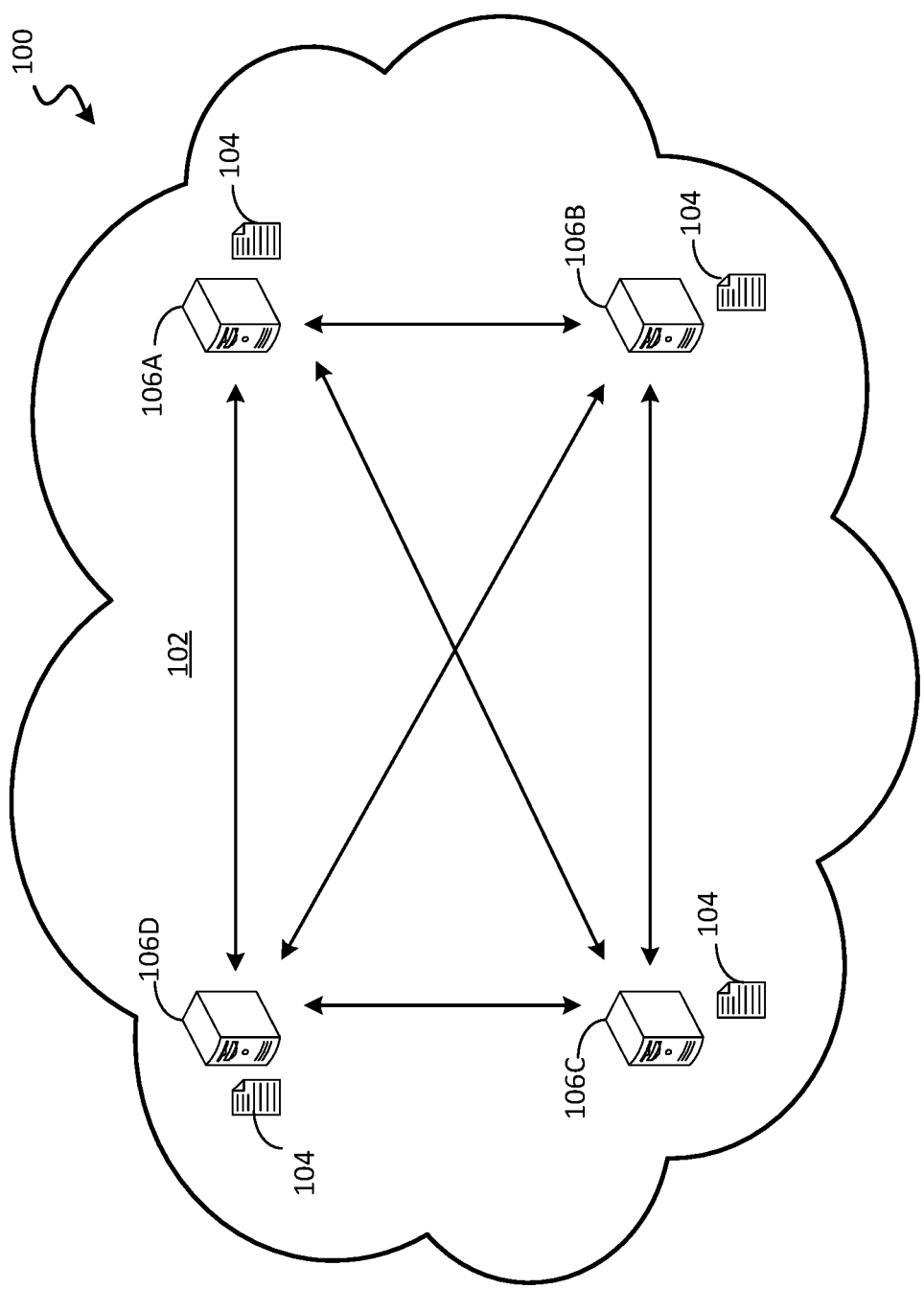
FIG. 1 illustrates a system for implementing a blockchain network, according to some embodiments.

Techniques for implementing a blockchain system for confidential and anonymous execution of smart contracts are described. A token platform in the form of a smart contract can allow users to set up token accounts that are linked to the users' cryptocurrencies accounts. Operations performed in the token platform can remain confidential and anonymous such that users on the blockchain may not be able to determine transfer amounts and/or the identity of the sender/receiver. Cryptographic techniques such as zero-knowledge proofs may allow public verification of data while preserving confidentiality and anonymity. The token platform can also invoke other smart contracts to support various complex applications.

Prior to discussing the details of the various embodiments, an explanation of various terms are provided below.

A "blockchain" may refer to a distributed database. A blockchain can be used to maintain a continuously growing list of records called blocks. A blockchain can be used to maintain a record of transaction or events between parties in a way that is difficult to falsify. Each block in a blockchain may include several records as well as a hash of previous blocks in the blockchain. If a record in a previous block is changed, the hash may be disrupted in any following blocks. The result is that in order to falsify a given record, the hacker has to falsify that record and all subsequent records so that the hashes end up the same. This is extremely difficult in practice. Additionally, a blockchain may be distributed among a large number of entities. Any changes to the blockchain may be verified by comparing it to the numerous individual records.

A "record" may refer to evidence of one or more interactions. A digital record can be electronic documentation of an interaction. A record can include a record identifier and record information. For example, record information can include information describing one or more interactions and/or information associated with the interactions (e.g., a digital signature). Record information can also include multiple data packets each of which include different data describing a different interactions. A record identifier can be a number, title, or other data value used for identifying a record. A record identifier can be nondescript, in that it may not provide any meaningful information about the record information in the record. Examples of records include medical records, academic records, transaction records, credential issuance records, etc. In some embodiments, a record can be stored in a block of a blockchain. An individual block may include an individual record or a predetermined number of records, and a blockchain can be a series of records organized into blocks.

A "smart contract" may refer to distributed computer executable program code. A smart contract may contain a set of rules under which the parties to the smart contract agree to interact with each other. If and when the pre-defined rules are met, the program code is executed and the agreement implemented in the program code is automatically enforced. The smart contract code can be executed in a blockchain network to provide a decentralized automated mechanism to facilitate, verify, and enforce negotiation or performance of an agreement or transaction.

A "node" or "network node" may refer to a connection point in a communication network. A network node can be a physical electronic device that is capable of creating, receiving, or transmitting data. In some embodiments, a network node may be a computing device within a record-keeping network (e.g., a blockchain network). A network node may be able to create a data package (e.g., a data payload), transfer a data package, receive a data package, validate a data package, access a central record, and/or perform any other suitable functions. Different types of network nodes may be able to perform different sets of functions within a recording network. In some embodiments, a network node may be associated with and/or operated by a resource provider such as an online service provider, a content provider, a certificate authority, a financial institution (e.g., a bank), a merchant, a transaction processing network, or any other suitable entity.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to verify a digital signature created with the corresponding private key. The public key may be distributed throughout a network in order to allow for verification of messages signed using the corresponding private key. Public and private keys may be in any suitable format, including those based on RSA or elliptic curve cryptography (ECC). In some embodiments, a key pair may be generated using an asymmetric key pair algorithm.

A "signature" may refer to an electronic signature for a message or some data. A digital signature may be a numeric data value, an alphanumeric data value, or any other type of data including a graphical representation. A digital signature may be a unique data value generated from a message/data and a private key using an encrypting algorithm. In some embodiments, a validation algorithm employing a public key may be used to verify the signature.

A "user" may refer to an entity such as a person, an organization, or a device or system associated with or operated by the person or organization that utilizes a resource for some purpose. A user may have one or more accounts that can be used to access the resource. A user may also be referred to as an account holder, a consumer, a subscriber, or a cardholder, etc., according to some embodiments.

A "computing device" may refer to a device that includes one or more electronic components (e.g., an integrated chip) that can communicate with another device or entity. For example, a computing device may include at least one processor coupled to a memory that stores instructions or code for execution by the processor, and may include a communication interface that allows the computing device to interact with other entities. A computing device can be a portable computing device that can be transported and operated by a user. A portable computing device may provide remote communication capabilities to a network. The portable computing device can be configured to transmit and receive data or communications to and from other devices. A portable computing device may be in the form of a mobile device such as a mobile phone (e.g., smart phone, cellular phone, etc.), tablets, portable media player, personal digital assistant devices (PDAs), wearable device (e.g., watch, bracelet, ring, eyeglasses, health monitoring device such as a fitness tracker, etc.), electronic reader device, etc., or in the form of a card (e.g., smart card) or a fob, etc. Examples of portable computing devices may also include portable computers (e.g., laptops, netbooks, ultrabooks, etc.). A portable computing device may also be in the form of a vehicle (e.g., an automobile), or be integrated as part of a vehicle (e.g., an infosystem of a vehicle). Other examples of computing devices may include Internet of Things (IoT) devices, smart appliances and electronics, gaming consoles, etc. A computing device may also include multiple devices or components (e.g., when a device has remote access to a network by tethering to another device—both devices taken together may be considered a computing device).

A "server computer" may refer to a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "hash" may refer to data returned by a hash function (e.g., a function that can be used to map data of arbitrary size to data of fixed size). A hash can be used to uniquely identify secret information. In many cases, it is statistically unlikely that two different input data values have the same hash. Examples of hashing algorithms may include MD5, MD6, SHA variants, etc.

FIG. 1 illustrates a system 100 for implementing a blockchain network, according to some embodiments. In FIG. 1, a blockchain network 102 is depicted as including a number of nodes. The nodes of blockchain network 102 may include any number of validation nodes. Each of the validation nodes 106A-D may be a computing device associated with an entity or a user participating in blockchain network 102, and may maintain a ledger 104 (e.g., a blockchain) distributed amongst the group of validation nodes 106A-D in blockchain network 102. In some embodiments, ledger 104 may contain records of transactions conduct between cryptocurrency accounts in blockchain network 102.

A user operating a user device (e.g., one of validation nodes 106A-D, or a computing device in communication with a validation node) may initiate a transaction by generating a cryptographically signed message and sending the message to blockchain network 102. The message may include transaction data such as information pertaining to a recipient and an amount. Once a validation node has received the message, the validation node may distribute the message to the other validation nodes in blockchain network 102. Each of the validation nodes 106A-D may include the transaction represented by the message in a block of transactions and attempt to validate or cryptographically solve the block. The first validation node that solves the block may provide the solution to the other validation nodes for verification, and ledger 104 maintained at each of validation nodes 106A-D can be updated to add the block to ledger 104 to effect the transaction.

In some embodiments, system 100 can support either a UTXO-based cryptocurrency such as Bitcoin or an account-based cryptocurrency such as Ethereum. In a UTXO-based cryptocurrency model, every new transaction spends one or more UTXOs, all of which are stored on the blockchain. So for example, to spend five Bitcoins, a user must use past transactions addressed to the user whose unspent portions sum to at least five Bitcoins. In an account-based cryptocurrency model, a transaction amount is compared to the sender's account balance to ensure the account has sufficient funds. The account-based model can be referred to as being stateful, because the account balances at a point in time can represent a state of the blockchain. The stateful property of the account-based model may allow smart contracts to be built such that certain interactions are executed based on the state of the blockchain.

Using an account-based model to implement a privacy-preserving smart contract mechanism in system 100 can have various advantages.

Storage: Storage on a blockchain can be expensive (both computationally and fees collected by a validation node) and should be minimized as much as possible. If a UTXO-based model is used, then all unspent transactions need to be stored. Moreover, for an UTXO-based cryptocurrency that provide cryptographic anonymity, all spent transactions have to be stored as well. This makes the UTXO-based model expensive to use.

Privacy: The account-based model provides a natural mixing property. A new transaction in the account-based model draws from the total available balance, whereas the UTXOs used to create a new transaction in the UTXO-based model can reveal a lot of information about the new transaction, even if all the amounts are cryptographically hidden. For example, if a UTXO (even encrypted) originated from a user's employer is used to create a new transaction, then the user is likely going to spend a significant amount. Furthermore, even though UTXOs may potentially provide better anonymity, users can often be de-anonymized in practice.

Interoperability with smart contracts: An account-based privacy-preserving mechanism can easily interoperate with smart contracts, which typically maintain accounts for their users and for the contract itself. For example, a private account can be used to fund an account on the smart contract, or be tied to a payment channel smart contract. Funds can be added to the channel by simply adding funds to the private account.

Adoption: Account-based cryptocurrencies such as Ethereum, Ripple, EOS, Stellar account for some of the most valuable cryptocurrencies. An account-based privacy mechanism can be used to introduce private transactions to these platforms.

Simplicity for users: Privacy in the account-based model may encourage users to have a small number of accounts, making account management simpler. This also makes the system more efficient overall.

Accordingly, an account-based model cryptocurrency such as Ethereum can be used as the platform for implementing a privacy-preserving mechanism in system 100. In some embodiments, the privacy-preserving transaction mechanism may require no changes to the design of the underlying cryptocurrency platform such as Ethereum. The privacy-preserving transaction mechanism may be referred to herein as "Zether," and can be implemented as a smart contract on the cryptocurrency platform. Zether, as a smart contract, can be executed either individually, by other smart contracts, or invoke other smart contracts to exchange confidential amounts of a token, denoted by "ZTH." Zether can provide both confidentiality by hiding transaction amounts and anonymity by hiding the identity of the senders and the recipients. Although various aspects of Zether are described herein using Ethereum as the cryptocurrency platform, it should be understood that the techniques used in Zether can be applied to other account-based cryptocurrencies, independent of their consensus mechanisms. In some embodiments, to improve the computational efficiency of Zether, a new zero-knowledge (ZK) proof mechanism, referred to as $\Sigma$-Bullets is used. $\Sigma$-Bullets enhances the interoperability of $\Sigma$-protocols and Bulletproofs, and allows Bulletproofs-based range proofs to be efficiently combined with ElGamal encryptions and ring-signature based anonymous transfers. As a smart contract, Zether can be used to build other privacy-preserving applications such as a decentralized auction mechanism that fully hides the bids, a confidential payment channel mechanism, a confidential stake voting protocol, a private proof-of-stake protocol, etc.

To facilitate a better understanding of Zether, a brief description of the Ethereum platform is provided below.

Ethereum's basic unit are accounts. There are: (a) externally-owned accounts (EOAs) controlled by private keys; and (b) contract accounts controlled by their code. Both types of accounts can have an ether balance, denominated in units of wei (1 ether is equivalent to 1e18 wei). The Ethereum blockchain tracks the state of every account. State changes are initiated through transactions coming from EOAs. A transaction consists of the destination account address, a signature $\sigma$, the transferred amount in wei, an optional data field representing inputs to a contract, a gasLimit value, and a gasPrice value. The term "gas" in Ethereum can be used to refer to the computational costs associated with posting a transaction to the blockchain. Every EOA can be associated with a nonce, which is a counter that increments with every transaction. The signature σ is a cryptographic signature of the transaction and the sender's nonce. During transaction processing, σ is verified against the nonce value. As a result, transactions cannot be "replayed" on the Ethereum network.

A transaction can transfer wei between accounts or trigger the execution of smart contract code. Smart contracts can send messages to other smart contracts, mimicking function calls. Every transaction and code execution is replicated on all nodes in the network. Every executed operation has a specified cost expressed in terms of gas units. For example, storing 256 bits of data costs 20,000 units of gas while changing it costs 5,000 units and reading it costs 200 units. The sender pays for all smart contract operations that the transaction calls.

The sender can use the gasLimit field to specify the total amount of gas it is willing to spend for a transaction, and the gasPrice field to specify the amount of wei it is willing to pay per unit of gas. A miner (e.g., a validation node) that is happy with the gas price can include the transaction in a block and collect the fee. If the gas limit falls short of the gas needed to process the transaction, the miner may collect the fee but not change the blockchain's state. Excess fees are refunded to the account that issued the transaction.

The total gas consumed by all transactions in a block is limited. Thus, the number of transactions in a block can vary depending on the complexity of the transactions, but the total gas consumed by the transactions in a block should not exceed the block limit. This ensures that the time needed for processing and propagating a block remains sufficiently small, allowing for an adequately-decentralized network. Currently, that limit is around 8 million gas units. Simple arithmetic operations cost 3 gas units and the average block time is 15 seconds. The total Ethereum network can, therefore, perform less than 180 k arithmetic operations per second. Some complex operations, e.g., the Keccak 256-bit hash function, however, do not need to be arithmetized, but are provide as a standalone functionality at a reduced cost (e.g., 36 gas units for a 32-byte hash).

Smart contracts can be written in a specific cryptocurrency platform programming language such as Solidity. Once compiled to bytecode, the smart contract can be read and executed by an Ethereum virtual machine (EVM), a sandboxed and isolated runtime environment, where the code running inside the EVM has no access to network or other processes on the computing device. The EVM has access to a global persistent storage system, and each smart contract account can have a separate storage available to it.

In Ethereum, transactions are processed individually in an arbitrary order. Therefore, smart contract codes should be written properly so that unexpected outcomes are avoided when a common part of the EVM state is changed by two or more transactions. The low computational power, along with the asynchronous transactional nature of the Ethereum network make programming complicated smart contracts a delicate endeavor.

1 Overview of Zether

A high-level overview of Zether and considerations taken into account in creating the architecture of Zether will now be described.

Homomorphic commitments such as Pedersen commitments can be used to make transactions confidential. Though Pedersen commitments are simple and efficient, the opening of these commitments are transferred to the recipient so that the recipient can subsequently use the funds. This randomness can be stored on-chain in some encrypted manner or sent directly to the recipient through a separate channel. In the UTXO model, if the recipient is unable to recover the randomness (an incorrect value was encrypted/sent, nothing sent at all, etc.), then the recipient cannot spend the UTXO later. However, other UTXOs controlled by the recipient are not affected at all and could still be spent. On the other hand, with an account-based model, since all the incoming transfers go into the same account, failure to recover the randomness for even a single transfer could render the whole account unusable. One solution may require sender to encrypt the randomness under recipient's public key, and prove that the commitment indeed uses the randomness encrypted. Another implementation may use ElGamal encryption with messages in the exponent. This encryption scheme has linear encoding properties (making the scheme homomorphic), which can be utilized to create efficient ZK-proofs of the correct encryption.

1.1 Transferring Confidentially

A simplistic version of Zether with the core functionalities will first be described below, followed by improvements to the simplistic version. Besides privacy, one goal of Zether is to ensure funds of honest users are not lost.

A Simplistic Zether

The Zether smart contract (ZSC) works with Zether tokens (ZTH). Zether accounts are identified with ElGamal public keys. To fund an account with public key y with b ZTH, one can send b ETH (ether) to the smart contract. ZSC generates an ElGamal encryption of b with randomness 0 (since b is anyway part of the transaction) and adds it to the encrypted balance associated with y. One can convert ZTH back to ETH by revealing the current balance b* and providing a ZK-proof that y's ciphertext (e.g., the ciphertext associated with y on the smart contract) indeed encrypts b*.

In order to transfer some b amount of ZTH to a public key y' without revealing b itself, one can encrypt b under both y and y'. A ZK-proof is provided to show that the two ciphertexts are well-formed, they encrypt the same positive value, and the remaining balance associated with y is positive. A new ZK-proof system, called Σ-Bullets can be used to efficiently prove the statements over the encrypted transfer balance and the new sender balance.

Incoming Transfers

One issue with the simplistic version of Zether stems from the fact that the ZK-proofs are generated with respect to a certain state of the smart contract. For example, the ZK-proof in a transfer transaction needs to show that the remaining balance is positive. A user Alice may generates this proof with respect to her current account balance, stored in an encrypted form on the contract. However, if another user Bob transfers some ZTH to Alice, and Bob's transaction gets processed first, then Alice's transaction will be rejected because the proof will not be valid anymore. Note that Bob may be a totally benign user, yet Alice loses the fees she paid to process her transaction. This situation can be referred to as the front-running problem. Burn transactions may have a similar problem too because a proof that a ciphertext encrypts a certain value becomes invalid if the ciphertext changes.

To solve this issue, one may introduce a new type of transaction that just locks an account to keep away incoming transfers. Alice could wait until this transaction gets into the blockchain before initiating an outgoing transfer (or doing a burn). While this seems to fix the issue (at the cost of making transfer, the primary transaction, a two-step process), it creates new issues for users like Bob who want to send ZTH to Alice. Alice's account may not be locked when Bob publishes a transfer transaction tx, but it may get locked before tx gets in, resulting in tx being rejected.

Any kind of locking approach becomes more untenable when implementing anonymity. If Alice wants to hide herself among other users and make sure her transaction gets through, she will have to lock all the accounts in the anonymity set. Alice may not have permission to lock accounts of other users. Alternatively, Alice may only put locked accounts in her anonymity set. However, if someone unlocks their account before Alice's transaction gets in, Alice's degree of anonymity is reduced.

Pending Transfers

To address the front-running problem, all the incoming transfers are kept in a pending state. These transfers are rolled over into the accounts from time to time so that the incoming funds could be spent. This rollover may not happen at arbitrary times, otherwise the proofs can get invalidated again.

As such, time can be divided into epochs where an epoch consists of k consecutive blocks. The choice of k depends on two factors: (1) the gap between the latest state of blockchain and any user's view; and (2) the time it takes to get a transaction into the blockchain. At the end of every epoch, pending transfers are rolled over into the corresponding accounts. Users are expected to publish their transfer or burn transaction at the beginning of an epoch so that even if they do not see the latest state of the blockchain and it takes some time for their transaction to be included, they do not step into the next epoch. As long as k is chosen properly, transactions will be processed before the account changes state.

Rolling Over on a Smart Contract

However, rolling over is not as straightforward as it may appear because a smart contract may not do anything unless a transaction is sent to it. One cannot expect every user to send a rollover message for every epoch. Moreover, it may be difficult to get such a message in at the right time.

One idea is to rollover the pending transfers for all the accounts on the receipt of the first message in an epoch. This, however, places an unreasonably large burden on the sender of that message, as the sender will have to pay for the cost of rolling over the accounts that it does not own. Furthermore, users may have no way to know if their transaction would be the first in an epoch, so they cannot estimate the right amount of gas to supply.

As such, an account can be rolled over in an epoch when the first message from that account is received. To achieve this, a separate process for rolling over is implemented, and the first thing every other method does is to call this roll over method. There can be accounts that do not get rolled over for several consecutive epochs because no transaction is initiated from them. This is not an issue because the account holder is not trying to use her balance anyway. At some later point in time, when the user wants to operate on her account, the user will publish a transaction. All the amounts transferred into her account since the last rollover will be rolled over immediately and become available to be spent. Indeed, when the user creates a ZK-proof, she will assume the state of her account to be what it would be when all the pending transfers are rolled over into it.

Replay Protection

The mechanism described so far may be susceptible to replay attacks.

Ethereum provides replay protection of its own by associating nonces with every account, which is signed into every transaction. Unfortunately, this level of protection is not enough for Zether due to two reasons: (1) Zether accounts have their own public keys, which are not associated with Ethereum addresses; (2) Zether transactions contain non-interactive ZK-proofs. A malicious actor can steal these proofs and put them inside new transactions. If the state of the account has not changed, then the new transactions will also be processed successfully, leading to loss of funds. Another feature of Zether allows accounts to be locked to other smart contracts. Even if the request to lock a Zether account shows knowledge of the secret key, and the account is unlocked later, an adversarial entity may lock the account again by just replaying the request.

To protect against such issues, a nonce can be associated with every Zether account. The nonces can be incremented as transactions are processed. A new transaction from an account must sign the latest value of the nonce associated with the account along with the transaction data, which includes any ZK-proof. This approach binds all components of a transaction together and ensures freshness. ZK-proofs cannot be imported into malicious transactions and valid transactions cannot be replayed.

Although Ethereum addresses themselves can be used as the identities of Zether accounts to leverage Ethereum's replay protection and signature verification, this may force users to operate a Zether account from a fixed Ethereum address. As a result, users may not be able to delegate the account to a different address, like when locking the account to a smart contract. Furthermore, Ethereum addresses are a hash of public keys, not the full form. Proving statements about hashes in zero-knowledge is quite computationally expensive. Lastly, having separate public keys for Zether accounts also helps make the design more modular and platform-independent.

1.2 Transferring Anonymously

To enable users of Zether to transfer ZTH anonymously, additional issues are address as described below.

More Complex ZK-Proof

An anonymous transfer transaction enables a user Alice with public key $y_A$ interested in sending b ZTH to another user Bob with public key $y_B$ to hide both herself and Bob among a larger group of users U with public keys $\{y_1, \ldots, y_n\}$, along with hiding b. As a result, Alice provides a more complex ZK-proof $\pi$. Specifically, Alice generates n ciphertexts $C_1, \ldots, C_n$ under keys $y_1, \ldots, y_n$ respectively. $\pi$ shows that all the ciphertexts are well-formed; only two of the underlying amounts are non-zero and their values only differ in sign; and the remaining balance of the account with positive amount is non-negative.

Several optimizations can be used to reduce the size of $\pi$ and verification cost. As noted above, the prover sends n ciphertexts, and all of them except two encrypt 0. This can be leveraged in the proof construction such that the proof statement only contains two range proofs as sub-statements. For example, one-out-of-many proofs can be used. These proofs can give a secondary encryption to one out of n ciphertexts without revealing which original ciphertext was re-encrypted. One-out-of-many proofs can be used to build ring-signatures. Alice uses this proof to create secondary encryptions of b and −b under $y_A$ and $y_B$ respectively along with a secondary encryption of Alice's balance b*. Alice then simply shows the relationship between b and −b and that b and b*−b are non-negative using a range proof.

Replay and Double-Spend Protection

TAn anonymous transaction published by Alice involves multiple accounts only one of which Alice may own. To preserve anonymity, Alice's account may not be treated in any special way. Indeed, all the accounts involved in the transaction should be treated in the same way. Thus, the nonces associated with each one of them should be incremented. However, this can create another issue. Other account holders involved in Alice's transaction may have generated a transaction with the previous value of nonce. If their transactions get in later, then they will be rejected. If even one of them gets in before, then Alice's transaction will be rejected.

A different approach to replay protection can be used to implement anonymity. Every epoch can be associated with a base $g_{epoch}$ derived from hashing some predetermined fixed string such as "Zether" and the current epoch number. To initiate a transfer or burn transaction from an account with public key $y=g^{sk}$, $g_{epoch}^{sk}$ can be included in the transaction. More precisely, the proof π described above for a transfer transaction can also show knowledge of sk such that $\bar{g}=g_{epoch}^{sk}$ for $\bar{g}$ included in the transaction. (Burn transactions' proofs can also include this.) It should be noted that g is computationally unlinkable to y under the DDH assumption. Thus, g can be uses as the nonce in the sequel.

While in the case of confidential transfers, the transfer amount is subtracted from the sender's balance immediately but keep pending for the receiver, the same approach may not be used for anonymous transfers. All the transfer amounts, whether positive (for the receiver), negative (for the sender) or zero (for others) can be kept pending. Thus, an anonymous transfer transaction may not immediately affect the balance of any of the users involved. This may open up the system to double-spending attacks. A user may generate two transfer transactions in an epoch, sending her total balance to two different users. The attached ZK-proofs would both be valid because they will be verified against the same state. Fortunately, the nonce as described above, in addition to preventing replay attacks, can also prevent such double-spending attacks.

During every epoch, ZSC can accumulate nonces as they come, rejecting any transaction that reuses a nonce. The set of nonces does not grow indefinitely; as it is reset to null at the beginning of every epoch. Thus, providing anonymity does not lead to a continuous growth in the size of the state of ZSC. This approach may limit even honest users to initiate at most one transfer or burn transaction in a given epoch.

Global Updates

With the new replay protection mechanism in place, a few global updates are t made in each epoch: set the base for the epoch and empty the nonce set. These updates can be made at the receipt of the very first message in an epoch, be it from any account. Thus, users may have to provide a little more gas to cover the possibility that their message could be the very first one in an epoch. In most cases, this extra gas can be reimbursed.

1.3 Interoperability with Smart Contracts

One design goal for Zether is to be interoperable with other smart contracts. This presents a challenge as it is impossible to know in which way other smart contracts may want to use Zether. Further, the other smart contracts may contain bugs or even be maliciously designed. Unlike a cleartext currency like Ethereum (ETH), a smart contract may not simply issue a ZTH transfer as doing so requires creating ZK-proofs. Smart contracts, however, have only public states and thus are unable to store secrets necessary to create ZK-proofs.

One solution is to lock an account to a smart contract, say SC. In effect, this transfers the ownership of the account to SC. Any transfer from the account will need to go through SC. The transfer still needs to contain a valid ZK-proof, and as such will need to be created by the user. SC finally can unlock an account to return control to the original user.

Anonymous Transfers

If some accounts involved in an anonymous transaction are locked to a smart contract then, naturally, all of the locked accounts must be locked to the same contract. Furthermore, the transaction may be processed only if it comes from that contract.

Pending Locks

Suppose Alice publishes a transaction in a certain epoch to lock her account to a smart contract. The locking should not take effect immediately because Bob may have published a transfer transaction (at about the same time as Alice) with Alice in his anonymity set while her account was still unlocked. If Alice's transaction gets in first, locking her account, then Bob's transaction will be rejected. The same holds for unlocking as well. Therefore, when ZSC is invoked to lock/unlock an account, it just records the request but does not act on it immediately. When the account is rolled over in some later epoch, the request will be executed. Recall that every method on ZSC first checks if there is a need for roll over.

Replay Attacks

Lock transactions also need replay protection. In fact, using the account secret key, the sender must sign both the nonce and an address (to which the account will be locked) in the case of confidential transfers, and both the epoch base and address in the case of anonymous transfers. As a result, for the latter case, lock transactions can be published at the beginning of an epoch just like transfer and burn transactions.

1.4 Σ-Bullets

Zether ensures that encrypted transactions are correct by using ZK proofs that certify correctness without revealing any additional information. A custom proof system called Σ-Bullets can be used for Zether. Σ-Bullets integrate Bulletproofs with Σ-protocols to enable efficient proofs on algebraically-encoded values. In this manner, a set of ElGamal encrypted values can be proven efficiently to be in some range. Further, one-out-of-many proofs also known as ring signatures can be combined with range proofs to allow anonymous transfers. Σ-Bullets inherit from Bulletproofs the trapdoor-free setup and the short, logarithmic sized, proof lengths. The ability to prove statements on encrypted values further significantly reduces the prover and verifier time.

2 System Components and Methods

Figure 2:
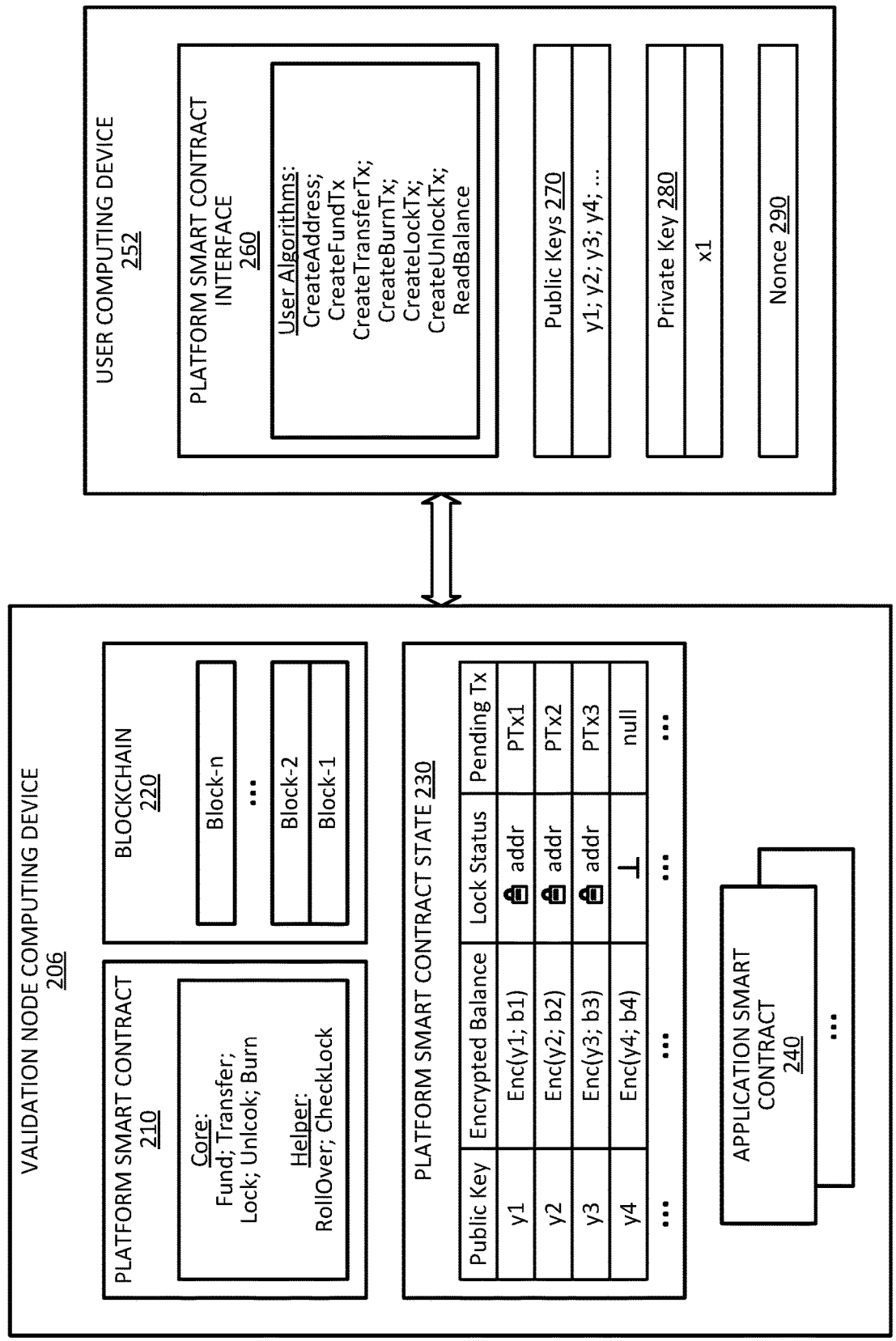
FIG. 2 illustrates a blockchain system implementing a platform smart contract, according to some embodiments.

FIG. 2 illustrates a block diagram of a blockchain system implementing a platform smart contract, according to some embodiments. The blockchain system may include a validation node computing device 206 that is part of a blockchain network and a user computing device 252 operated by a user.

Validation node computing device 206 may include a processor and a memory storing computer executable code. In some embodiments, validation node computing device 206 may include one or more cryptoprocessors with specialized arithmetic logic units dedicated for performing cryptographic operations such as encryption, decryption, proof validation, and the like. The computer executable code stored in the memory can implement a platform smart contract 210 (e.g., a Zether smart contract) and maintain a local copy of a blockchain 220 that stores validated transaction data records in the blockchain system.

In some embodiments, platform smart contract 210 can be written in a cryptocurrency platform programming language (e.g., Solidity used in Ethereum), and can be compiled for execution in a virtual machine (e.g., EVM). Platform smart contract 210 may include a set of core algorithms, and a set of helper algorithms that are called by the core algorithms to facilitate functions performed by the core algorithms. Platform smart contract 210 may also be associated with a platform smart contract state 230 representing a current state of platform smart contract 210.

The set of core algorithms may implement the following functions: Fund; Transfer; Lock; Unlock; and Burn. The Fund function is used to convert a cryptocurrency amount from a cryptocurrency account (e.g., ETH from an Ethereum address) into tokens (e.g., ZTH) associated with a public key. The Transfer function is used to transfer an amount of tokens from one public key to another. The Lock function is used to lock a public key (and its associated account) to an address such as an address of an application smart contract or another account. Once a public key is locked, transfer of tokens associated with the public key and unlocking of the public key cannot be performed unless the operation came from the address that the public key is locked to. The Unlock function is used to unlock a locked public key, and can be only effective if called by the address that the public key is locked to. The Burn function is used to convert tokens (e.g., ZTH) associated with a public key back to a cryptocurrency amount for a cryptocurrency account (e.g., ETH for an Ethereum address).

The set of helper algorithms may implement a RollOver function and a CheckLock function. The RollOver function is used roll over or put into effect pending transactions (e.g., transfers, burns, lock/unlock operations). In some embodiments, invocation of the RollOver helper function can be the first operation performed in each of the core algorithms. The CheckLock function is used to determine that a lock/unlock function is initiated from a proper address.

Validation node computing device 206 may also store a platform smart contract state 230 representing a current state of platform smart contract 210. Platform smart contract state 230 may include a set of entries representing accounts participating in platform smart contract. Each entry may include a public key that can be used to reference an account, an encrypted balance represent the amount of tokens available for the public key, a lock status of the public key, and pending transaction(s) associated with the public key. The lock status indicates whether a public key (and its associated account) is locked. If the public key is locked, the lock status may indicated the address that the public key is being locked to. If the public key is not locked, the lock status may indicate an unlocked status Pending transactions store pending transactions associated with a public key. A transaction (e.g., transfer, and/or lock, etc.) initiated in a particular epoch can initially be considered a pending transition and is recorded as such in platform smart contract state 230. The pending transaction associated with a public key can take effect or be rolled over to the corresponding account in a subsequent epoch (e.g., at later epoch when a new transaction involving that public key is invoked).

The executable code stored in the memory of validation node computing device 206 may also implement one or more application smart contracts such as application smart contract 240. Application smart contract 240 can be, for example, a sealed-bid auction smart contract, a payment channel smart contract, a stake voting smart contract, or a proof-of-stake smart contract, etc., and can be written in a cryptocurrency platform programming language (e.g., Solidity used in Ethereum). Application smart contract 240 can invoke platform smart contract 210 or vice versa. Application smart contract 240 is associated with a smart contract address (e.g., can be a cryptocurrency account address), and a public key can be locked to application smart contract 240 to prevent transactions with that public key from being processed by platform smart contract 210 unless the source of the transactions is from application smart contract 240. This is achieved by invoking the lock function with the smart contract address of application smart contract 240. Once a public key is locked to application smart contract 240, transactions involving the public key may be processed by platform smart contract 210 only if the transactions came from application smart contract 240, and only application smart contract 240 may unlock the public key.

A user can interact with platform smart contract 210 (e.g., to issue transactions) using a user computing device 252. In some embodiments, user computing device 252 can be a user's portable or desktop computer, mobile device, tablet, etc., another validation node computing device, or be validation node computing device 206 itself. User computing device 252 may include a processor and a memory storing computer executable code. The computer executable code stored in the memory can implement a platform smart contract interface 260 that can be invoked to interact with platform smart contract 210. In some embodiments, platform smart contract interface 260 can be part of a cryptocurrency application. User computing device 252 may also store a set of public keys 270 corresponding to accounts participating in platform smart contract 210, a private key 280 corresponding to the public key associated with the account of the user of user computing device, and a nonce 290.

Platform smart contract interface 260 may include a set of user algorithms that implement various functions to interact with platform smart contract 210. The set of user algorithms may implement the following functions: CreateAddress; CreateFundTx; CreateTransferTx; CreateBurnTx; CreateLockTx; CreateUnlockTx; and ReadBalance. The CreateAddress user function is used to generate a public and private key pair. The generated public key can be used as an address to reference the account of the user in platform smart contract 210. The public key is shared with other users participating in platform smart contract 210. The private key is kept private, and is used to generate signatures and proofs. The CreateFundTx, CreateTransferTx, CreateBurnTx, CreateLockTx, and CreateUnlockTx are used to invoke their counterparts in platform smart contract 210. These user algorithms may output transaction data to request their corresponding functions in platform smart contract 210. The transaction data may include a set of public keys of the accounts involved in the transaction, ciphertexts representing amounts if a transfer is involved, a signature generated by signing nonce 290 with private key 280, and a proof that is validated by validation node computing device 206 to effect the transaction. In some embodiments, the nonce can be a counter that is incremented for each transaction associated with the public key, or an epoch base that is unique for each epoch (e.g., can be derived from hashing a predetermined string and an epoch number of an epoch during which the corresponding transaction is initiated). The ReadBalance function is used to obtain the balance associated with the user's public key from platform smart contract state 230. Additional details of the platform smart contract algorithms and user algorithms are further described in sections 5 and 6 below.

To conduct a confidential transaction hiding the amount of the transaction, a user may first use the CreatAddresss function to generate a private and public key pair. The CreateFundTx function can then be called to generate a fund transaction request to convert a cryptocurrency amount into tokens for platform smart contract 210. When platform smart contract 210 receives the fund transaction request, platform smart contract 210 may validate the cryptographic proof in the fund transaction request and invoke the Fund function. When the Fund function is invoked for the first time for a public key, a new entry is created in platform smart contract state 230, and the public key and an encrypted balance representing the amount of tokens being funded from the cryptocurrency account are stored in the entry. The encrypted balance can be derived from encrypting the balance using the public key. If the public key already exists in platform smart contract state 230 already when the Fund function is invoked, the funding amount is encrypted using the public key and added to the encrypted balance using homomorphic encryption.

The user may then invoke the CreateTransferTx to generate a transfer transaction request to transfer an amount of tokens from the user's public key to another user's public key. The transaction data of the transfer transaction request may include the public keys of the sender and receiver, a first operand ciphertext encrypting the negative of the transfer amount using the sender's public key, and a second operand ciphertext encrypting the transfer amount using the receiver's public key. When platform smart contract 210 receives the transfer transaction request, platform smart contract 210 may validate the cryptographic proof in the transfer transaction request and invoke the Transfer function. The Transfer function may then roll over any pending transactions on the public keys of the sender and receiver from prior epochs, verify that the public keys of sender and receiver are not locked (or are locked to the sender's address), verify the signature on the transfer transaction request, and post the transfer transaction as a pending transaction on the public keys of the sender and receiver. At a later epoch when another transaction is initiated on the public keys, the pending transaction is rolled over by adding the first operand ciphertext (representing a negative of the transaction amount) to the encrypted balance of the sender and adding the second operand ciphertext (representing a positive of the transaction amount) to the encrypted balance of the receiver. Because the transaction amount and updated balances are encrypted, a public view of platform smart contract state 230 would not be able to determine the transaction amount, thus creating confidentiality for the transaction.

The confidential transaction described above does not, however, hide the transacting parties as a public view of platform smart contract state 230 would be able to determine which account balance have been updated. To conduct a confidential and anonymous transaction, the transaction data of the transfer transaction request may further include additional public keys of other accounts not involved in the transaction, and additional operand ciphertexts corresponding to the additional public keys by encrypting a value of zero. The transaction is then posted as a pending transaction to each of the additional public keys and the public keys of the sender and receiver. When the pending transaction is rolled over, the first operand ciphertext (representing a negative of the transaction amount) is added to the encrypted balance of the sender, the second operand ciphertext (representing a positive of the transaction amount) is added to the encrypted balance of the receiver, and the additional operand ciphertexts (encryption of zero by corresponding public key) are added to the respective balances of the additional public keys. A public view of platform smart contract state 230 would not be able to determine which parties are the sender and receiver because the balances associated with a larger group of public keys are all being updated.

To conduct more complex functions and transactions such as sealed-bid auctions, stake voting, etc., platform smart contract 210 can interoperate with one or more application smart contracts such as application smart contract 240. A user participating in application smart contract can invoke the CreateLockTx function to lock the user's public key to application smart contract 240. Other users participating in application smart contract 240 can similarly be locked to application smart contract 240. Application smart contract 240 can be executed to perform its underlying functions, causing one or more transactions to be performed on the locked public keys. Application smart contract 240 can then send the one or more transactions to platform smart contract 210 to be processed, and unlock the locked public keys.

Having conducted one or more transactions in platform smart contract 210, a user can convert the user's account balance from tokens back to cryptocurrency by invoking the CreateBurnTx function to generate a burn transaction. When platform smart contract 210 receives the burn transaction request, platform smart contract 210 can validate the burn transaction request, and call the Burn function. The Burn function may validate the balance, credit the cryptocurrency account of the user with the balance in the cryptocurrency, and update platform smart contract state 230 by adding a ciphertext representing the negative of the balance to the current encrypted balance of the corresponding public key.

Figure 3:
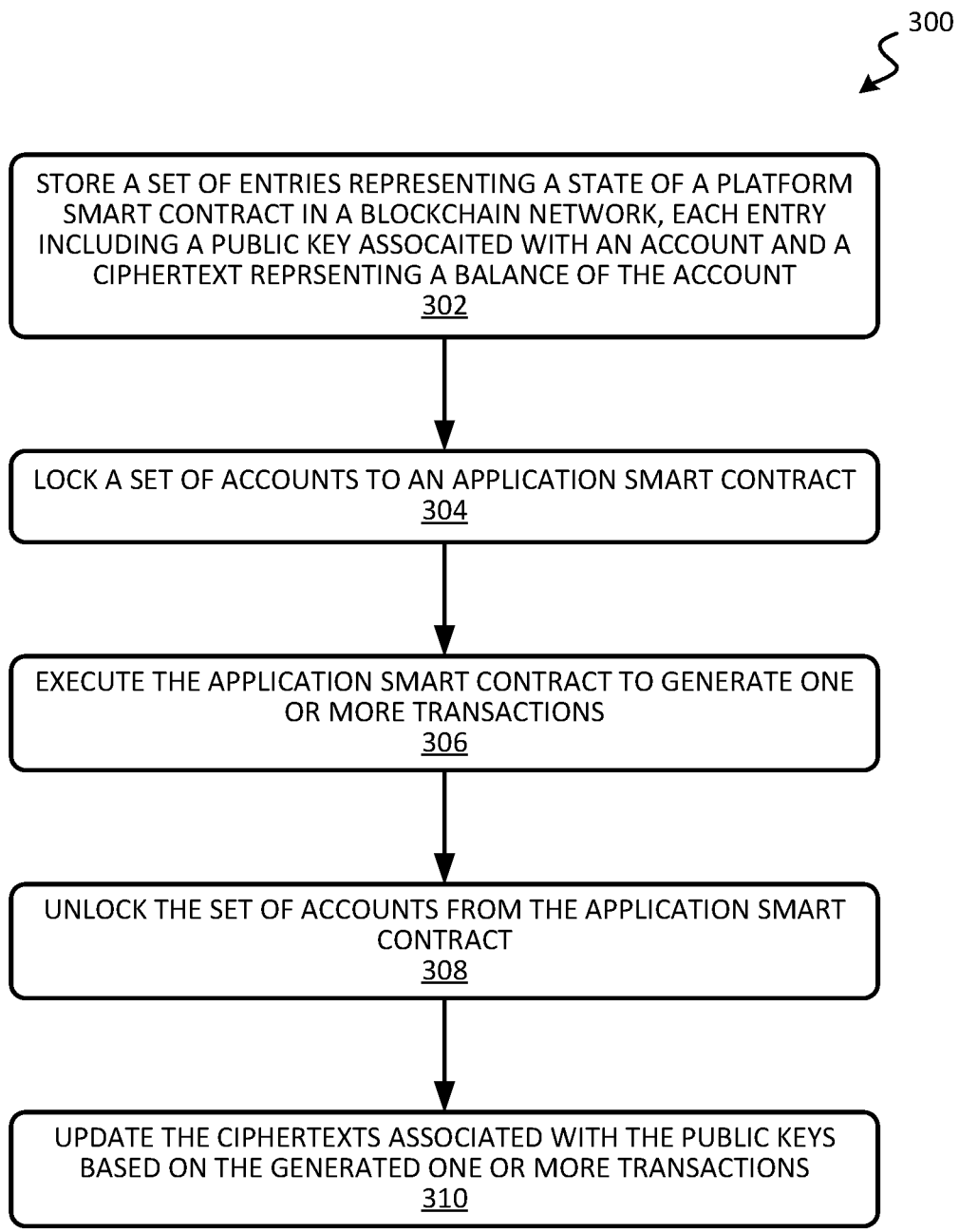
FIG. 3 illustrates a flow diagram of a process for transacting in a platform smart contract, according to some embodiments.

FIG. 3 illustrates a flow diagram of a process 300 for transacting in a platform smart contract, according to some embodiments. Process 300 may begin at block 302 by storing a set of entries representing a state of a platform smart contract (e.g., Zether) in a blockchain network. Each of the entries may include a public key associated with an account and a balance ciphertext representing a balance of the account. The balance ciphertext can be generated, for example, by encrypting the balance with the public key of the corresponding account. For example, the set of entries may include a first entry having a first public key associated with a first account, and a first balance ciphertext representing a first balance of the first account; a second entry having a second public key associated with a second account, and a second ciphertext representing a second balance of the second account; and a third entry having a third public key associated with a third account, and a third ciphertext representing a third balance of the third account.

At block 304, the platform smart contract may lock a set of accounts (e.g., at least the first, second, and third accounts) to an application smart contract. The set of accounts can be a subset of or all accounts participation in the platform smart contract. An account can be locked in response to receiving a lock request from a user device associated with the account. In some embodiments, the lock request may include the public key associated with the account, a smart contract address associated with the application smart contract that the account is being locked to, and a signature generated based on the smart contract address. The signature can be generated, for example, by encrypting the smart contract address and a nonce (e.g., counter value or epoch base). In some embodiments, the lock request can be received during a particular epoch, and locking of the account can occur or take effect in a subsequent epoch after the particular epoch. In some embodiments, while an account is locked to the application smart contract, only the application smart contract is permitted to unlock the account.

At block 306, the application smart contract is executed to perform its underlying functions resulting in one or more transactions to be performed on the locked accounts. For example, the one or more transactions resulting from execution of the application smart contract may cause the first balance of the first account to be decremented by a first amount, and the second balance of the second account to be incremented by a second amount. The transaction data of each transaction may include a cryptographic proof and a signature generated based on a nonce (e.g., counter, or an epoch base derived from hashing a predetermined string and an epoch number of an epoch during which the transaction is initiated). It should be noted that the application smart contract still relies on the user device to generate the underlying transaction data (e.g., cryptographic proof, signature), because only the user device has access to the necessary private key used in generation of the transaction data. In some embodiments, the transaction can be stored as a pending transfer transaction of the first account during a particular epoch, and roll over of the pending transfer transaction to the first account can occur in a subsequent epoch after the particular epoch. The roll over can be performed in response to receiving a subsequent transaction involving the first account.

At block 308, the application smart contract may unlock the accounts locked to the application smart contract, including, for example, the first, second, and third accounts from the application smart contract. At block 310, the balance ciphertexts associated with the public keys can be updated based on the generated one or more transactions. For example, the first balance ciphertext of the first account can be updated by adding a first operand ciphertext to the first balance ciphertext (e.g., the first operand ciphertext can be generated by encrypting a negative of the first amount using the first public key) and the second balance ciphertext of the second account can be updated by adding a second operand ciphertext to the second balance ciphertext (e.g., the second operand ciphertext can be generated by encrypting the second amount using the second public key). If anonymity is desired the third balance ciphertext of the third account can be updated by adding a third operand ciphertext to the third balance ciphertext, where the third operand ciphertext can be generated by encrypting zero using the third public key.

Although FIG. 3 and its corresponding description above have been described with reference to executing an application smart contract to perform transactions on the platform smart contract, it should be understood that transactions can be performed on the platform smart contract without locking the public keys to an application smart contract. For example, basic transfer transactions from one account to another can be performed without locking the accounts if involvement of an application smart contract for more complex functions is not needed.

Figure 4:
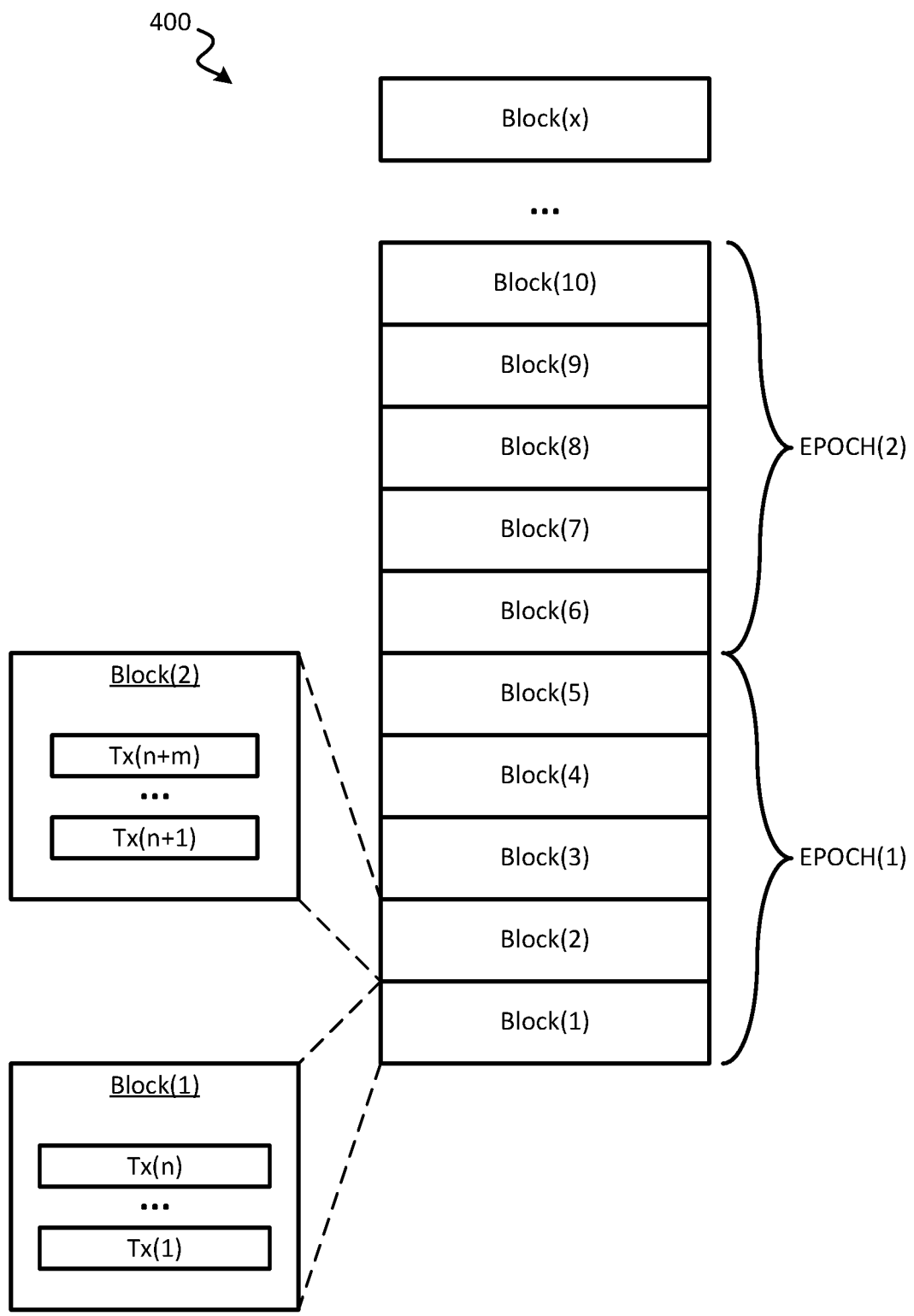
FIG. 4 illustrates a conceptual diagram of an epoch, according to some embodiments

FIG. 4 illustrates a diagram depicting the epoch concept, according to some embodiments. Blockchain 400 may include any number of blocks 1 through x. Each block may include one or more transactions. The number of transactions in each block can vary depending on the gas required for each transaction in the block. Transactions requiring more complex proof validation may consume more gas than less complex transactions. Each block has a fixed gas limit that is set by the system, and the sum of the gas required for each transaction in a block may not exceed the limit of the block. Thus, block(1) may include n transactions that do not exceed that limit, and block(2) may include m transactions that do not exceed that limit, where m and n can be different numbers. An epoch may include a predetermined number of blocks. For example, as shown in FIG. 4, each epoch may contain five blocks. Thus, epoch(1) may include blocks(1)-(5), and epoch(2) may include blocks(6)-(10), and so on. A transaction request that is received in epoch(1) can be posted as a pending transaction until it is rolled over in a subsequent epoch such as epoch(2) or a later epoch. At that point, when the transaction takes effect, the transaction data can be recorded in a new block.

3 Implementation Preliminaries

The following section describes various notations and tools used in describing the algorithms and cryptographic proofs of Zether.

3.1 Notation $\lambda$ is used to denote a security parameter. Let GroupGen be a polynomial-time algorithm that on input $1^\lambda$ outputs (p, g, $\mathbb{G}$) where $p=\theta(\lambda)$, p is prime, $\mathbb{G}$ is a group of order p, g is a generator of $\mathbb{G}$, and the decisional Diffie-Hellman (DDH) assumption holds in $\mathbb{G}$. The DDH assumption states that a tuple (g, $g^a$, $g^b$, $g^{a \cdot b}$) is computationally indistinguishable from (g, $g^a$, $g^b$, $g^c$) for random a, b, c. It implies the discrete logarithm assumption.

Let $\mathbb{Z}_p$ denote the integers modulo p. $\mathbb{Z}_p^*$ is the set of inverses in $\mathbb{Z}_p$. The notation [a, b] for a, b∈$\mathbb{Z}$ is used to denote the set of integers {a, a+1, . . . , b−1, b}.

The notation $$x \xleftarrow{\$} S$$

is used to denote x is sampled uniformly at random from a set S. PPT is sued as a shorthand for probabilistic polynomial time, and negl($\lambda$) is used to denote negligible functions.

3.2 Tools

ElGamal Encryption

ElGamal encryption is a public key encryption scheme secure under the DDH assumption. A random number from $\mathbb{Z}_p^*$, say x, acts as a private key, and $y=g^x$ is the public key corresponding to that. To encrypt an integer b, it is first mapped to one or more group elements. If b∈$\mathbb{Z}_p$, then a simple mapping would be to just raise g to b. Now, a ciphertext for b is given by ($g^b y^r$, $g^r$) where $$r \xleftarrow{\$} \mathbb{Z}_p^*.$$

With knowledge of x, one can divide $g^b y^r$ by $(g^r)^x$ to recover $g^b$. However, $g^b$ needs to be brute-forced to compute b.

It should be noted that the Zether smart contract does not need to do this, only the users would. Further, users will have a good estimate of ZTH in their accounts because the transfer amount is typically known to the receiver. Thus, the above brute-force computation may occur only rarely. One can also represent a large range of values in terms of smaller ranges. For instance, if amounts up to 64 bits are allowed, two amounts of 32 bits each can be used instead, and each one of them can be encrypted separately. In some implementations, a single range, 1 to MAX, with MAX being $2^{32}$ can be used.

The primary benefit of putting balances in exponent is that it makes ElGamal encryption additively homomorphic. If b and b' are encrypted under the same public key y to get ciphertexts ($C_L = g^b y^r$, $C_R = g^r$) and ($C_L' = g^{b'} y^{r'}$, $C_R' = g^{r'}$) respectively, then ($C_L C_L' = g^{b+b'} y^{r+r'}$, $C_R C_R' = g^{r+r'}$) is an encryption of b+b' under y.

Zero-Knowledge Proofs

A zero-knowledge (ZK) proof of a statement does not reveal any information beyond the validity of the statement. For example, one could prove that two ciphertexts encrypt the same message without revealing the message itself. Though any NP (nondeterministic polynomial) statement can be proved in zero-knowledge, the concrete costs depend on a number of factors.

$\Sigma$ protocols are honest-verifier public-coin zero-knowledge interactive proofs of a special form. Very efficient $\Sigma$ protocols exist for proving a wide variety of algebraic statements like knowledge of b and r such that an ElGamal ciphertext encrypts b with randomness r. The Fiat-Shamir transform is a way of transforming any public-coin honest-verifier ZK-proof (like $\Sigma$-protocols) into a non-interactive zero-knowledge proof of knowledge in the random oracle model.

A ZK-proof for the statement $$\text{st: } \{(a,b,c, \ldots ;x,y,z, \ldots ): f(a,b,c, \ldots ,x,y,z, \ldots )\}$$

means that the prover shows knowledge of x, y, z, ... such that $f$ (a, b, c, ..., x, y, z, ...) is true, where a, b, c, ... are public variables. The notation st[a, b, c, ...] is used to denote an instance of st where the variables a, b, c, ... have some fixed values.

Signature schemes are used to authorize messages by signing them. A verifier can check a signature but will be unable to forge a signature on a previously unsigned message. Signatures can be built from Fiat-Shamir transformed NIZK proofs A non-interactive ZK (NIZK) proof system can be represented with algorithms (Setup$_{nizk}$, Prove, Verify$_{nizk}$), where Setup$_{nizk}$ outputs some public parameters, Prove generates a proof for a statement given a witness, and Verify$_{nizk}$ checks if the proof is valid with respect to the statement. Zether uses NIZKs that are correct (an honest prover can produce a valid proof), zero-knowledge (a verifier learns nothing from the proof but the validity of the statement), and sound (a computationally bounded prover cannot convince a verifier of a false statement). $\Sigma$-protocols, with the Fiat-Shamir transform applied, have all these properties.

A signature scheme with algorithms (Setup$_{sig}$, Sign, Verify$_{sig}$) is used, where Setup$_{sig}$ outputs some public parameters, Sign generates a signature on an input message, and Verify$_{sig}$ checks if the signature is valid with respect to the message. Zether uses a signature scheme that is correct (it is possible to create valid signatures on arbitrary messages) and existentially unforgeable (a computationally bounded adversary can't create a valid signature on a new message, even after seeing signatures on other messages).

4 Transaction Mechanism

A transaction mechanism for Ethereum consists of a set-up routine, user algorithms, and a platform smart contract. The platform smart contract maintains a state st which changes over time. The state at block height h is denoted by $\text{st}_h$. Users rely on the state of the platform smart contract to create transactions. A user account is identified by a public key pk. Let MAX be the maximum amount of money that the mechanism can handle. Any amount below must be an integer between 0 and MAX.

The transaction mechanism also provides a way to lock funds of an account to an Ethereum address addr so that the address can control the movement of funds through the account, until the lock is released. The locking/unlocking feature can be used to bring privacy to several commonly used smart contracts.

The term transaction is used in Ethereum to refer to a signed data package that stores a message to be sent from an externally owned account to another account on the blockchain. It can include binary data (its payload) and ether. If the target account contains code, that code is executed and the payload is provided as input data. For a transaction tx, the notation tx·ETH is used to denote the amount of ether being sent through tx.

Contracts can call other contracts or send ether to non-contract accounts by the means of message calls. The message call msg.sender.transfer (in the syntax of Solidity) transfers a certain amount of ether from a contract to the sender who called it. For a transaction tx that calls a function $f$ on a contract, $f$ (tx)·ETH is used to denote the amount of ether successfully sent back to the caller when $f$ is executed with tx.

The various components of the transaction mechanism will now be described.

Set-Up

In the set-up phase, some public parameters are generated. They could be distributed off-chain or put into the smart contract (described below). The platform smart contract is also deployed.

User Algorithms

A user can run one of the following algorithms to interact with the platform smart contract. The output of these algorithms are raw transactions. The transaction will be signed (using the public key of the Ethereum account from which they are sent) and destined to the Zether smart contract. Nonetheless, the notation tx:addr is used to denote the Ethereum address addr from which tx was sent. All the algorithms get the security parameter as input but is show explicitly only for the first one.

1. CreateAddress($1^\lambda$)→(sk, pk). CreateAddress provides a way for a user to uniquely identify itself to the smart contract. It takes (a unary representation of) the security parameter as input and outputs a secret key sk and a public key pk. It is assumed that pk is derived in a deterministic way from sk, and use pkOf(sk) to denote the public key that corresponds to sk.
2. CreateFundTx(pk, amt)→tx$_{fund}$. CreateFundTx is used to add funds to an account. It takes a public key pk and an amount amt as inputs. It outputs tx$_{fund}$=(pk, ...).
3. CreateTransferTx(sk$_{from}$, pk$_{to}$, AnonSet, amt, st$_h$)→tX$_{trans}$. CreateTransferTx is used to transfer money from one account to another amongst a set of accounts. It takes a secret key sk$_{from}$, a destination public key pk$_{to}$, a set of public keys AnonSet such that both pkOf(sk$_{from}$) and pk$_{to}$ belong to it, an amount amt, and the state of the smart contract st$_h$ at a certain block height h as inputs. It outputs tX$_{trans}$=(AnonSet, ...).
4. CreateBurnTx(sk, st$_h$)→tx$_{burn}$. CreateBurnTx is used to withdraw the entire balance from an account. It takes a secret key sk and a state st$_h$ as inputs. It outputs tx$_{burn}$=(pkOf(sk), amt, ...).
5. CreateLockTx(sk, addr, st$_h$)→tx$_{lock}$. CreateLockTx is used to lock an account to an Ethereum address. It takes a secret key sk and an address addr as inputs. It outputs tx$_{lock}$=(pkOf(sk), addr, ...).
6. CreateUnlockTx(pk)→tx$_{unlock}$. CreateUnlockTx is used to unlock an account. It takes a public key pk as input. It outputs tx$_{unlock}$=(pk, ...).
7. ReadBalance(sk, st$_h$)→b. ReadBalance is sued to find the balance of an account. It takes a secret key sk and state st$_h$ as inputs, and outputs an integer b.

Platform Smart Contract

The platform smart contract has five functions: Fund, Transfer, Burn, Lock and Unlock. They take $tx_{fund}$, $tX_{trans}$, $tX_{lock}$ and $tx_{unlock}$, respectively. These functions output 1 or 0, denoting success and failure respectively. If any of the inputs are not of the correct type the function automatically fails. Moreover the functions check certain properties of the input, such as verifying a proof or checking a nonce. If any of these checks fail, the function outputs 0. The five functions modify the state st as needed. SC is used as a shorthand to denote the platform smart contract.

SC has access to the current block height and the sender of every transaction. (In Solidity, the syntax for these are block.number and msg.sender, respectively.) It makes use of two constants: maximum amount value MAX and epoch length E, where $E \geq 1$. The epoch number of a block at height h is defined to be $\lfloor h/E \rfloor$. Thus, for example, the blocks at heights 0, 1, ..., E−1 are in the first epoch, the ones at heights E, E+1, ..., 2E−1 are in the second epoch, and so on.

Honest Behavior

Three of the (transaction-generating) user algorithms described above, transfer, burn and lock, take a state of the blockchain as input. An honest user is supposed to run these algorithms only at the beginning of an epoch, using the state of the epoch that just concluded. Indeed, the user may not be in complete sync with the blockchain and a transaction could suffer some delay, but a good choice of epoch length would take care of these problems. Also, no more than one transfer or burn transaction (not one of each) should be generated per account in any epoch. (This restriction can be omitted if only confidentiality is desired.) For a transfer transaction, if user puts a locked account in its anonymity set, then all accounts must be locked to the same address.

4.1 Correctness

Correctness captures the basic functionality a transaction mechanism should provide if transactions are generated honestly but they could be sent from arbitrary Ethereum addresses and processed in an arbitrary order. Assume, however, that if a transaction is generated in a certain epoch, then it gets processed in the same epoch. To illustrate this, suppose Alice has X ZTH in her account. At the beginning of epoch $e_1$, she publishes a transfer transaction to send Y ZTH to someone else. There could be other users in the network who include Alice's account in their anonymity set. Their transactions could be processed before Alice's transaction and so on. In $e_1$, Alice also receives Z ZTH from others. Now, in any epoch after $e_1$, if she publishes a burn transaction at the start of the epoch with amount X−Y+Z, then she should get back that amount of ETH.

To specify correctness formally, the notion of an ideal state and how it evolves over time as honestly generated transactions are processed will now be described. The ideal state tracks the balance of every account and the Ethereum address (if any) to which it is locked. When a transaction is processed, the ideal state is updated depending on the type of transaction and the current state. For e.g., for a transfer transaction, it is checked that if some accounts in the anonymity set are locked, then they are all locked to the same Ethereum address. Thus, a transaction mechanism is correct if whenever a burn transaction is processed for a certain account, the amount of Ether returned to the user is equal to the amount of Zether held in the ideal state account.

4.2 Security Requirements

Two security requirements can be defined for a transaction mechanism n, overdraft-safety and privacy. Overdraft-safety ensures that users cannot misuse the smart contract to withdraw more money from their accounts that they rightfully own. Privacy of a payment-mechanism ensures that no additional information about the payments of honest parties beyond the intended is leaked to an adversary. For example, no adversary should be able to distinguish between transfer transactions that transfer any amount between any two public keys in an anonymity set which consists of honest parties only, as long as the sender has enough funds.

A game can be defined between a challenger Chal and an adversary Adv to capture the requirements, where Chal represents the honest users in the network. Both Chal and Adv have access to an oracle $O_{SC}$ who maintains the smart contract SC. Adv has full view of the oracle: it can see all the transactions sent by Chal to SC, how the state of SC changes, etc. Adv is provided with substantial control over SC's state. It can instruct any honest party at any time (via the challenger) to publish a transaction. It can create its own malformed transactions based on the transactions of honest parties, and then push the former into the blockchain ahead of the latter. In particular, it can arbitrarily delay the transactions of honest parties.

For overdraft-safety, some quantities can be associated with the game with respect to Adv: EtherDeposited, ZetherReceived and EtherBurnt, which have self-explanatory names. Informally, a transaction mechanism is safe against overdrafts if EtherDeposited+ZetherReceived EtherBurnt. It should be noted that it may not be enough to just require that the total ether burnt (honest parties and adversary combined) should be no more than the total ether deposited because it could still be possible that the adversary is able to burn more than its fair share. The more direct approach of computing the amount adversary can withdraw by just reading the balance of the accounts controlled by it from the smart contract may not be used because its secret keys are not available.

The game discussed above can be modified to capture the privacy requirement. Instead of sending just one instruction to Chal every time (asking an honest party to create a transaction), Adv sends two consistent instructions at some point. Chal executes the (b+1)-th instruction based on a bit b hidden from Adv, which is chosen randomly in advance. Adv is supposed to guess b at the end of the game. (This is the typical left-or-right setting used for indistinguishability-based definitions.) Consistency is defined carefully to rule out trivial wins for the adversary. For e.g., if the anonymity sets associated with two create transfer transaction instructions are different, then Adv can trivially guess b.

5 Zether Transaction Mechanism

The Zether transaction mechanism will now be described. It may include three components: a global setup algorithm that is run once to generate the global parameters for the protocol as well as to deploy the Zether smart contract. The second component is the Zether smart contract (ZSC) that handles transactions between users, interoperability with external smart contracts, and keeps the state of the system. The final component of the mechanism are the user algorithms which describe how users can interact with the smart contract and create valid transactions. A user is of course not bound to the behavior described in the user algorithms.

5.1 Set-Up

The set-up algorithm calls $Setup_\pi$ and $Setup_{sig}$ as subroutines, which are the set-up algorithms for the proof system and the signature scheme, respectively. The former set-up could depend on the relations for which proofs are constructed. If these subroutines are trustless, then the whole set-up is trustless, meaning that it's correctness can be verified publicly. Bulletproofs and Schnorr signatures, both of which have a trustless set-up, can be used. Zether significantly differs from ZeroCash in this respect because ZeroCash has a trusted setup and its security is broken if the setup is subverted.

Zether's setup specifies an epoch length E and a maximum amount value MAX. Honest users are supposed to make only one transfer or burn transaction per epoch. If these transactions are delayed by more than E, then they may become invalid.

Set-up algorithm is formally described in FIG. 5. Apart from setting up proof system and signature scheme, it initializes account tables acc and pending transfers table pTransfers (recall that incoming transfers are put into a pending state first), a last roll over epoch table lastRollOver to keep track of the last epochs accounts were updated, a lock table lock to keep track of the addresses to which accounts are locked, a pending lock table pLock to temporarily hold lock requests, a nonce set $\mathcal{U}$ to prevent replay attacks, a variable $b_{total}$ that tracks the total amount of ZTH held by the contract, a global last update variable t to record the last epoch in which any account was updated, and lastly, an epoch base $g_{epoch}$.

5.2 Zero-Knowledge Relations

Each transfer and burn transaction in Zether contains a ZK-proof which ensures that the transfer is valid without revealing the reasons why it's valid.

Burn Transactions

Consider a burn transaction where a user needs to verifiably decrypt his Zether balance. It can certainly do this by revealing its secret key to the smart contract. However, an adversary can use the secret key to decrypt all previous balances and transactions of the user, thus completely breaking its privacy. So, instead of decrypting in the clear, the user creates a ZK-proof for the following statement:

$$st_{burn}: \{(y, C_L, C_R, u, b, g_{epoch}; sk): \\ y = g^{sk} \wedge C_L = g^b C_R^{sk} \wedge u = g_{epoch}^{sk}\} \quad (1)$$

The statement shows that the user knows an sk such that y is indeed the public key corresponding to sk, $C_L$, $C_R$ is a valid encryption of b under y, and u is the correct nonce with respect to sk for the current epoch.

Confidential Transaction

A transfer transaction will now be described. For intuition, valid transactions will first be described with reference to the purely confidential variant of Zether which does not provide any additional anonymity. Suppose a user wants to transfer an amount $b^*$ from a public key y to a public key $\bar{y}$. Let $(C_L, C_R)$ be the encryption of balance associated with y. The smart contract needs to deduct $b^*$ from y's balance and add the same amount to $\bar{y}$'s balance. Since $b^*$ is hidden in this process, user will encrypt $b^*$ under both y and $\bar{y}$ to get (C, D) and $(\bar{C}, \bar{D})$, respectively. A proof is provided to show that:

1. both ciphertexts are well formed and encrypt the same value;
2. $b^*$ is a positive value; and,
3. the remaining balance of y, say b', is positive too.

More formally, a user proves the following statement in the confidential version of Zether:

$$st_{ConfTransfer}: \{(y, \bar{y}, C_L, C_R, C, D, \\ \bar{C}, g; sk, b^*, b', r): C = g^{b^*} y^r \wedge \bar{C} = g^{b^*} \\ \bar{y}^r \wedge D = g^r \wedge C_L / C = g^{b'} (C_R/D)^{sk} \wedge y = g^{sk} \wedge b^* \in \\ [0, MAX] \wedge b' \in [0, MAX]\} \quad (2)$$

To make the zero-knowledge component more efficient, the same random number r is used to encrypt $b^*$ under both y and $\bar{y}$.

Anonymous Transaction

Anonymous transfers not only hide the transfer amount but also the sender and receiver in a transfer. Like above, a user wants to transfer an amount $b^*$ from a public key y to $\bar{y}$, but now it would like to hide the two keys among a larger set of public keys, say $y = \{y_1, \ldots, y_n\}$. Let $(C_L, i, C_R, i)$ be the encryption of the balance associated with key $y_i$, for $i \in [n]$. The user now needs to create n ciphertexts $(C_1, D_1), \ldots, (C_n, D_n)$ and prove that:

1. they are well-formed;
2. one of them (say jth) encrypts $b^*$, one of them (say $\ell$th) encrypts $-b^*$, rest encrypt 0;
3. $b^*$ is positive;
4. remaining balance in $y_j$ (say b') is also positive; and,
5. the correct nonce is declared.

To handle such a complex statement efficiently without revealing j, $\ell$, $b^*$ and b', new binary variables $s_1, \ldots, s_n$ and $t_1, \ldots, t_n$ are introduced. Value 1 for an $s_i$ denotes that money is being transferred from $y_i$ and value 1 for a $t_j$ denotes that money is being transferred to $y_j$. The user would keep these variables secret and prove various statements using them. Only one of $s_1, \ldots, s_n$ and one of $t_1, \ldots, t_n$ should be 1. This could be shown by proving that each of these variables is either 0 or 1, $\Sigma_i s_i = 1$ and $\Sigma_i t_i = 1$.

In addition, the user proves:

$$\prod_{i=1}^{n} C_i^{s_i} = g^{b^*} \prod_{i=1}^{n} y_i^{r s_i} \quad (3)$$

$$\prod_{i=1}^{n} C_i^{s_i + t_i} = \prod_{i=1}^{n} y_i^{r(s_i + t_i)} \quad (4)$$

$$C^{(1-s_i)(1-t_i)} = y_i^{(1-s_i)(1-t_i) \cdot r} \text{ for } i \in [n] \quad (5)$$

$$\prod_{i=1}^{n} \left(\frac{C_{L,i}}{C_i}\right)^{s_i} = g^{b'} \left(\frac{\prod_{i=1}^{n} C_{R,i}^{s_i}}{D}\right)^{sk} \quad (6)$$

$$g_{epoch}^{sk} = u \quad (7)$$

Given that exactly one of $s_1, \ldots, s_n$ is 1 and rest are 0, Eq (3) shows that the ciphertext for non-zero $s_i$ is a valid encryption of $b^*$. Subtracting Eq (3) from Eq (4) yields $\prod_{i=1}^{n} C_i^{t_i} = g^{-b^*} \prod_{i=1}^{n} y_i^{r t_i}$, which shows that the ciphertext for non-zero $t_i$ is a valid encryption of $-b^*$. Thus, Eq (3) and (4) together show that the ciphertexts that encode non-zero quantities are valid.

These statements can be proved more efficiently using techniques from one-out-of-many proofs and in particular the extension to ElGamal encryptions. These proofs are $\Sigma$ protocols that can be used to show that a decryption of one out of n ciphertexts has certain properties, e.g. they are 0. The proof size is only logarithmic in n. This is achieved by writing i in its binary representations and constructing n products such that only the ith is 1 and all other are 0.

In Eq (5), the expression $(1-s_i)(1-t_i)$ is non-zero only when both $s_i$ and $t_i$ are zero. For such i, $C_i$ should be an encryption of 0, which is what the equation shows. (When $s_i$ or $t_i$ is non-zero, both sides are of the equation are just 0.) Eq (6) shows that b' balance is left in the account for which $s_i$ is 1. Lastly, Eq (7) shows that u is the correct nonce for the current epoch.

Further, the user also needs to show that $g^{sk} \Pi y_i^{s_i}$, $b^* \in [0, MAX]$ and $b' \in [0, MAX]$, where the first equation ties the secret key to the spending public key (without revealing the latter), and the rest two show that the amount being transferred and the remaining amount are in the right range. Summing it up, the user proves the following statement:

$$st_{AnonTransfer}: \qquad (8)$$

$$\{((y_i, C_{L,i}, C_{R,i}, C_i)_{i=1}^n, D, u, g, g_{epoch}; sk, b^*, b', r, (s_i, t_i)_{i=1}^n)$$

$$\prod_{i=1}^n C_i^{s_i} = g^{b^*} \prod_{i=1}^n y_i^{r \cdot s_i} \wedge \prod_{i=1}^n C_i^{s_i + t_i} = \prod_{i=1}^n y_i^{r(s_i + t_i)} \wedge$$

$$D = g^r \wedge \left( C^{(1-s_i)(1-t_i)} = y_i^{(1-s_i)(1-t_i) \cdot r} \right)_{i=1}^n \wedge$$

$$\prod_{i=1}^n \left( \frac{C_{L,i}}{C_i} \right)^{s_i} = g^{b'} \left( \prod_{i=1}^n C_{R,i}^{s_i} \right)^{sk} \wedge g^{sk} =$$

$$\prod_{i=1}^n y_i^{s_i} \wedge g_{epoch}^{sk} = u \wedge (s_i \in \{0, 1\} \wedge t_i \in \{0, 1\})_{i=1}^n \wedge$$

$$\sum_{i=1}^n s_i = 1 \wedge \sum_{i=1}^n t_i =$$

$$1 \wedge b^* \in [0, MAX] \wedge b' \in [0, MAX]\}$$

The statement may be complex, but in fact highly structured. The resulting proof size can be logarithmic in the range and in the anonymity set. This is done by combining one-out-of-many proofs for showing that two encryptions are non-zero with Bulletproofs for range proofs and for showing that all other encryptions encrypt 0. The proofs can be efficiently combined using the extension of Bulletproofs called $\Sigma$-Bullets. Even with this efficient proof the transaction size will still be linear in the anonymity set. This is because the sender needs to send an encryption for each account in the anonymity set. This seems inherent as every account needs to be treated equally in an anonymous transfer. This limitation is not present in UTXO-based currencies where constant sized fully anonymous payment systems have been proposed and implemented. The requirement can be removed using fully homomorphic encryption.

5.3 Zether Platform Smart Contract

The Zether platform smart contract (ZSC) is shown in FIG. 6. It consists of five public methods (fund, burn, transfer, lock, unlock) and two additional internal helper methods (RollOver, CheckLock). The helper methods are used to modularize the contract's logic. Instead of introducing new notation, Solidity syntax is used in some places in the description of ZSC (see Table 1 for a description of the syntax).

TABLE 1

| Solidity syntax | |
| --- | --- |
| block.number | current block number |
| msg.sender | sender of the message (current call) |
| msg.value | number of Wei sent with the message |
| address.transfer | send given amount of Wei to address |
| require | check conditions; current call reverts if condition fails |

Rolling Over

Pending transfers for an account are rolled over into the account every epoch, or at least in the epochs the account is used. However, no instruction on a smart contract can execute unless triggered by a transaction. As a result, all public methods of ZSC first call RollOver on the input public key(s).

Given a public key y, RollOver checks if the last roll over was in an older epoch. If yes, then it rolls over the pending transfers pTransfers[y] into acc[y] and resets the last roll over epoch. It also rolls over any changes to the locking address of y. some global changes also need to be made in an epoch. For this, RollOver checks if the last global update t was in an older epoch. If so, then it sets $g_{epoch}$ for the current epoch, empties the nonce set $\mathcal{U}$ and resets t.

Locking

Recall that (un)locking is not supposed to take effect immediately, i.e. in the same epoch as the transaction is published; it must be deferred to the next epoch. Given a public key y, an address addr and a signature $\sigma_{lock}$, Lock checks if it is appropriate to operate on the account by calling CheckLock, which will be discussed in more detail shortly, and verifies that $\sigma_{lock}$ is a valid signature on addr and the current epoch base $g_{epoch}$. (This ensures that the account holder indeed wants to lock the account to addr at this time. Note that even if the signature is replayed, it would not affect anything.) It then sets addr to be a pending lock on y. Unlock method also calls CheckLock first, then sets the pending lock to be $\bot$ (unlock). In a later epoch when RollOver is called, it will set the lock to be the value in pending lock.

The internal method CheckLock takes as input a public key y and an Ethereum address addr, and returns 1 if it is appropriate for addr to operate on y. This is possible in two situations: (a) if lock status is $\bot$ (unlock) meaning that any address could operate on y; or (b) if lock status is equal to addr.

Funding

Anybody can fund an account, even an account that he/she does not own, by simply specifying the public key y and transferring some ETH. The only exception is for locked accounts; they can only be operated from the locking address. fund converts ETH into ZTH. The ETH gets stored in the smart contract and the ZTH are homomorphically added to y's (pending) balance. If the account does not exist yet, a new one is created. Fund also ensures that the deposit does not exceed the total amount of funds, MAX, that Zether can handle.

Burn

Burn converts ZTH back to ETH. It verifies the given proof $\pi_{burn}$ (see $st_{burn}$ in Eq (1)) and adds the nonce u to the set $\mathcal{U}$. The proof cannot be replayed in the same epoch because Burn also checks that $u \notin \mathcal{U}$. It also cannot be replayed in any other epoch because the epoch base would be different. Note that a burn operation does not close an account.

Transfer

Transfer transfers some ZTH from one of the accounts in the set y to another account. Since the transfer is anonymous, all accounts are treated in the same way; some (encrypted) balance is added to each one of them. The proof $\pi_{transfer}$ makes sure that these balances satisfy the right properties (see $st_{AnonTransfer}$ in Eq (8)).

5.4. User Algorithms

User algorithms specify how users can interact with ZSC, and are shown in FIG. 7. CreateFundTx and CreateUnlockTx algorithms are straight forward and thus not specifically shown in FIG. 7. The algorithms to create transfer and burn transactions first do a rollover of the input public key(s). This ensures that any pending transfers are rolled over and any pending lock request takes effect. In CreateTransferTx, the commitments $C_i$ and the variables $s_i$, $t_i$ for the sender and receiver (indices $i_{from}$ and $i_{to}$) are set to correspond to non-zero values. CreateBurnTx uses ReadBalance to recover the amount of ZTH in the account. Using the private key, ReadBalance finds the right b such that $C_L/C_R^x=g^b$. In typical cases, a user would not have to try all positive integers one by one to recover b. It will already have a good estimate of b.

6. Basic Zether

Zether can provide both anonymity and confidentiality. However, anonymity impacts both efficiency and usability: ZK-proofs are more complex and only one transfer/burn transaction can be made from an account in an epoch. A description of a non-anonymous Zether which provides just confidentiality but is more efficient will thus be described. This version of Zether can be referred to as "basic Zether".

In basic Zether, replay protection is achieved by associating a counter with every account. With every transaction, users need to provide a signature on the transaction data and the counter, binding the two together. (Ethereum takes the same approach.) Note that now there would not be any restriction on the number of transfer or burn transactions.

Global Set-Up

There are three main differences in set-up. First, there is no need to initialize a nonce-set, an epoch base or a global last update. Second, a new counter table ctr: $\mathbb{G} \to \mathbb{Z}$ is initialized to empty. And third, there is only a single lock table lock instead of two before.

Platform Smart Contract

The contract methods in basic Zether will now be described highlighting differences from Zether. There is one change in the method Fund: when a new record is created for y, the corresponding counter is set to 0. In methods Burn and Transfer, any logic related to epoch base can be omitted. Instead, they take a signature as input and verify that it properly signs all the inputs and the counter. A simpler statement for transfer, $St_{ConfTransfer}$ (see Eq (2)) is used. The statement for burn is also slightly simplified (but at the cost of an additional signature. $st_{burn}'$ is the same as $st_{burn}$ except that the check $u=g_{epoch}^{sk}$ is removed.

In method Lock, the signature is based on the counter instead of the epoch base. Locking and unlocking can go into effect immediately. RollOver is slightly simplified because no global changes need to be made, and no logic related to locking needs to be handled. FIG. 8 provides a formal description of the basic Zether platform smart contract methods. CheckLock is the same as shown in FIG. 6 and thus not specifically shown in FIG. 8.

User Algorithms

CreateAddress, CreateFundTx, CreateUnlockTx and ReadBalance do not change. CreateBurnTx and CreateTransferTx produce proofs for different statements and sign the output with the counter. CreateLockTx signs the counter instead of the epoch base. FIG. 9 provides for a formal description of the user algorithms. CreateAddres, CreateFundTx, CreateUnlockTx, and ReadBalance are the same as those with reference to FIG. 7, and thus not specifically shown in FIG. 9.

7 Optional Extensions

Various modifications for Zether can be adopted. These modifications will be described below.

Paying Gas in ZTH Through Economic Abstraction

One limitation of the anonymity of Zether comes from the fact that every transaction needs to pay fees in ETH pegged gas. This can be cumbersome as a ZTH holder needs to maintain both a Zether and an Ethereum account. This can also have consequences for the anonymity of a transaction. Every transaction is initiated by an EOA and that EOA pays for the gas. Unfortunately, no matter what privacy guarantees Zether has, transactions that are issued by the same EOA are inevitably linked. Even if a user controls multiple EOAs, she has to make sure that they remain unlinkable in order to send anonymous transactions on Zether. (The confidentiality of a transaction is not affected by this.)

Ideally, miners could receive transaction fees in ZTH instead of ETH which are by design exchangeable and have as such identical value. In order to do this, a transaction will be sent with a 0 gas price. This means that a newly created unlinked EOA can issue the transaction. Every transaction will specify the fee amount publicly. In the ZK-proof the sender now proves that his new balance is his old balance minus the transacted amount minus the fees. The fees is then sent to a fee pool within the Zether contract that can be spent from without further permission or secrets. A miner can simply insert a raking transaction at the end of the block that pays all of the fees to his account. The fee pool could also be used to fund contract-wide transactions such as RollOver.

The idea of paying fees in a non-native currency is called economic abstraction. The concept is particularly interesting with respect to Zether as it is would make Zether more usable and more private. The major obstacle to this approach is that miners would need to mine these special 0 gas price transactions and properly rake the fee pool. A similar approach that circumvents the miner adoption problem is to have special delegator nodes that issue the transactions to the network. Users would send their transactions to delegators who will forward them to the miners and will pay the Ethereum gas fees. These delegator nodes could be rewarded in Zether by adding their Zether address to the transaction. The fee amount would not go to the fee pool but to that address. For anonymity, transactions should ideally be relayed to either the miners or the delegators without revealing the original sender's identity. This can be achieved through anonymous communication networks like Tor.

Zether as a Native Token

Zether can be viewed as a mechanism to do private transactions in an account-based currency. If a currency like Ethereum, Ripple, EOS or Stellar or even a private blockchain like Sequence wanted to introduce private transactions then they can use a Zether style system. While Zether is described as a smart contract token that can be run on a smart contract platform, it is also possible to envision Zether becoming the native token of such a platform. Using Zether as a native token has several advantages. As discussed in the previous paragraph, it is important for Zether's anonymity that miners receive fees in ZTH. This is automatically ensured if ZTH is the native token in which fees are denominated. An additional benefit of Zether as a native token is that denial-of-service protection becomes simpler. Miners can process transactions in an arbitrary order. For example the proofs can be verified before the account balances are transferred. The use of pending transactions and roll over can potentially be omitted as the ordered processing allows a user to spend ZTH even if they receive funds in the same block. Depending on the block time, it may still be useful to maintain pending transactions to allow slightly outdated transactions to be processed correctly.

Various optimizations can be applied to Zether. If Zether is a native token, then these optimizations can be used to make transactions more efficient and scalable. For example, miners can run optimized proof validation software using efficient elliptic curves instead of using Ethereum's general purpose state machine. Further, Bulletproofs used in Zether can be verified more efficiently when processed in batches. This is beneficial as a fully verifying node can now more efficiently process a proposed block. This property can protect against the miners' dilemma, where miners may be disincentivized to verify blocks if verification becomes too expensive.

Multiple Recipients

Zether transfer transactions have one recipient only, but quite often Alice may want to send ZTH to several other users at the same time. While Alice can do a separate transfer for every recipient, a new transfer method can be implemented that accomplishes the same task much more efficiently. Consider the simpler case of confidential transactions and recall the statement stConfTransfer in Eq (2). Suppose Alice has a balance b and she wants to transfer $b_1^*, \ldots, b_n^*$ to n users.

Range proofs can be the most computationally expensive components of ZK-proofs in Zether both in terms of communication and computation. If separate transactions are generated, then Alice needs to show a total of 2n values to be positive: $b_1^*$, $b-b_1^*$, $b_2^*$, $(b-b_1^*)-b_2^*$, $\ldots$, $b_n^*$, $(b-b_1^*-\ldots-b_{b-1}^*)-b_n^*$. Instead, a single transaction can be generated that consists of an encryption of $\hat{b}=b_1^*+\ldots+b_n^*$ under Alice's public key, encryptions of $b_1^*$ under ith user's public key, range proofs for $b_1^*$, and a range proof for the remaining balance $b-\hat{b}$. Thus, there will be a total of n+1 range proofs as opposed to 2n, a saving of about 50%.

Locking Mechanism

When a Zether account is locked to a smart contract, it will only be affected by transactions coming from that contract. Specifically, no one else can deposit or withdraw money from the account. There could be other more flexible ways of locking accounts though. For instance, one could allow locked accounts to be funded from any address.

8 Proofs and Σ-Bullets

Transfer and AnonTransfer are medium-sized relations that involve proofs on encrypted data. Therefore, it would be desirable to use a proving system which is efficient (e.g., has short proofs and efficient verification) and allows proofs on cryptographically encoded data. Bulletproofs is a zero-knowledge proof system that produces short (logarithmic sized) proofs without relying on a trusted setup. Bulletproofs was specifically designed to work well with Confidential Transactions as proofs of statements which include values that are committed to in a Pedersen commitment. Its short proofs and trustless setup make Bulletproofs suitable for Zether's underlying proof system. However, unlike UTXO-based Confidential Transactions Zether relies on ElGamal encryptions instead of Pedersen commitments. Thus, a proving system similar to Bulletproofs but adapted to prove statements on ElGamal encrypted values can be used. Simply replacing Pedersen commitments with ElGamal encryptions is insufficient as ElGamal encryptions cannot be opened like a commitment, and are also not additively homomorphic if encryptions are under different keys, as is the case in Zether. Further, for AnonTransfer a one-out-of-many proof is combined with range proofs. The one-out of many proof is used to select the receiver and sender transfer encryption and the range proof ensures that no overdraft is created. Bulletproofs enables efficient range proofs, and there are logarithmic sized efficient Σ protocols for doing one-out-of-many proofs.

To efficiently prove these statements and instantiate Zether, a system referred to as Σ-Bullets is used. Σ-Bullets is an extension of Bulletproofs. It enables the combination of Σ-protocols and Bulletproofs. Given an arithmetic circuit, a Σ-Bullets proof ensures that a public linear combination of the circuit's wires is equal to some witness of a Σ protocol. This enhancement in turn enables proofs on many different encodings such as ElGamal encryptions, ElGamal commitments or Pedersen commitments in different groups or using different generators. Further, it allows the combination of different specialized Σ-protocols such as one-out-of-many proofs or accumulator proofs with the generic circuit-base proof system Bulletproofs. This can benefit other systems that want to prove statements on additively encoded witnesses.

Σ-Bullets

Bulletproofs enables proofs on Pedersen committed values by computing a linear combination of commitments and opening that combination. This uses the homomorphic property of Pedersen commitments that use the same commitment key. The core idea of Σ-Bullets is to replace this linear combination with a Σ-protocol. The Σ-protocol ensures that the linear combination of encoded values is equal to some public value. The efficient composability of Σ-protocols allows the opening to be combined with other proofs.

The prover first commits to the circuit's wires in A and to a vector of blinding values in S. The commitments are Pedersen vector commitments. The prover then receives challenges y, z and commits to polynomial t(X) using a polynomial commitment that can be verifiably opened to an evaluation of t(X). The prover does not commit to one of the coefficients of the polynomial, e.g. the 0 coefficient. If the prover is honest then the verifier can compute said coefficient from just the challenges and the commitments to wire values $v_i$s which are committed to in $V_i$. Finally the prover convinces the verifier that t(X) is equal to the inner product of two polynomials with vector coefficients. The two polynomials can be homomorphically constructed from A, S and the challenges. This final step uses an inner product argument which requires only O(log(n)) communication where n is the size of the circuit. The protocol can be made non-interactive using the Fiat-Shamir heuristic. Assume that given an arithmetic circuit Circuit: $\mathbb{Z}_q^n \times \mathbb{Z}_q^n \to \{0,1\}$ the prover wants to prove the following that she knows $\vec{a} \in \mathbb{Z}_q^n$, $\vec{v} \in \mathbb{Z}_q^m$ such that:

$$V_i = \text{Encode}(v_i) \forall i \in [1,m], \text{Circuit}(\vec{a},\vec{v})=1$$

| Prover | Verifier |
|---|---|
| Commit to wires values $\vec{a}$ in A | |
| Commit to randomness in S | |
| $\xrightarrow{A, S}$ | |
| | $y, z \leftarrow \$\mathbb{Z}_q$ |
| $\xleftarrow{y, z}$ | |

Use y to combine constraints
Such that they can be written as:

$$t(X) + \sum_{i=1}^{n} z^i v_i = \langle l(X), r(X), \rangle \in \mathbb{Z}_q$$

| Prover | Verifier |
|---|---|
| $\wedge$ t(0) = $\delta$(y, z) <br> l(X), r(X) $\in \mathbf{Z}_q{}^n \wedge$ deg(l, r) $\leq$ 3 <br> T = Commit(t(X)) | |
| $\xrightarrow{T}$ | |
| | $x \leftarrow \$\mathbf{Z}_q$ |
| | $\xleftarrow{x}$ |
| $\hat{t}$ = t(x), $\vec{l}$ = l(x), $\vec{r}$ = r(x) | |
| $\xrightarrow{\hat{t}, \vec{l}, \vec{r}}$ | |

Now the verifier creates commitment P to l(X), r(X) from A, S, y, z and checks the following condition:
1. T(0)=$t_0$
2. Open (T·$\Pi_{i=1}^m v_i^{z^j}$)+$\delta$(y, z)=$\hat{t}$
3. Open(P)=$\vec{l}$, $\vec{r}$
4. $\langle \vec{l}, \vec{r} \rangle = \hat{t}$ Note that second condition requires that T and the $V_i$'s are additively homomorphic. Therefore T and $V_i$ cannot be simply replaced with ElGamal encryptions as they are not homomorphic if done under different keys. The protocol can be generalized by simply requiring that the prover proves that $$\hat{t} = \Sigma_{i=1}^m v_i \cdot z^i + \delta(y,z) + \text{Open}(T). \tag{9}$$

This can be achieved through a simple $\Sigma$-protocol. The burn proof below shows this can be achieved given m=2 and $V_1$, $V_2$ being ElGamal encryptions. The security proof for the overall protocol is straightforward if the $\Sigma$-protocol proves a statement that implies Eq (9) while having special-soundness and zero-knowledge properties. The Bulletproof extractor simply extracts the openings of the Vs from the $\Sigma$-protocol. The simulator uses the $\Sigma$-protocol's simulator to generate a valid looking $\Sigma$-protocol as a sub-routine.

Burn Proof $\Sigma$-protocol for proving Statement $\text{st}_{Burn}$

| Prover | Verifier |
|---|---|
| $k_{sk} \leftarrow \$\mathbf{Z}$ | |
| $A_y = g^{k_{sk}}$ | |
| $A_{C_R} = C_R^{k_{sk}}$ | |
| $A_u = g_{epoch}^{k_{sk}}$ | |
| $\xrightarrow{A_y, A_{C_R}, A_u}$ | |
| | $c \leftarrow \$\mathbf{Z}_q$ |
| | $\xleftarrow{c}$ |
| $s_{sk} = k_{sk} + c \cdot sk$ | |
| | $\xleftarrow{s_{sk}}$ |
| | $g^{sk} = A_y \cdot y^c$ |
| | $C_R^{s_{sk}} = A_{C_R} \cdot \left(\frac{C_L}{g^b}\right)^c$ |
| | $g_{epoch}^{s_{sk}} = A_u \cdot u^c$ |

Proof Sketch

The sigma protocol is complete, honest-verifier zero-knowledge, and has special-soundness. Completeness is immediate. For zero-knowledge, a simulator S constructs valid and indistinguishable transcripts given a valid statement (y, $C_L$, $C_R$, u, b, g, $g_{epoch}$) and access to the verifier's state. The simulator will first samples a random challenge c a random $s_{sk}$ and computes $A_y = g^{s_{sk}} y^{-c}$, $$A_{C_R} = C_R^{s_{sk}} \left(\frac{C_L}{g^b}\right)^{-c}$$

and $A_u = g_{epoch}^{s_{sk}} u^{-c}$. If the verifier is honest, e.g., generates random challenges then c, $s_{sk}$ are uniformly distributed and $A_y$, $A_{C_R}$, $A_u$ form DDH tuples. The simulated transcripts are identically distributed. To prove special-soundness an extractor can compute the witness from two accepting transcripts with the same first round message $A_y$, $A_{C_R}$, $A_u$. The transcripts also contain (c, $s_{sk}$) and (c', $s_{sk}'$) respectively. If both transcripts are accepting then the extractor can output $$\widehat{sk} = \frac{s_{sk} - s_{sk}'}{c - c'}$$

as a valid witness. It can be directly deduced from the verification equations that $g^{sk} y \wedge$ $$C_R^{sk} = \frac{C_L}{g^b} \wedge g_{epoch}^{sk} = u.$$

$\Sigma$-Bullets ConfTransfer Proof

This section describes how exactly the $\Sigma$-Bullets construction is used to create an efficient proof for $\text{st}_{Transfer}$ the statement which proofs that a ConfTransfer transaction is valid. Bulletproofs is used to perform the range proofs and use a sigma protocol to prove that the balances are properly encrypted. The conjunction of these two is $\text{st}_{ConfTransfer}$.

The $\Sigma$ protocol takes as input the senders public key y the receiver's public key $\hat{y}$ and an encryption of the senders balance after the transfer $$C_{L,n} = \frac{C_L}{C}, C_{R,n} = \frac{C_R}{D}.$$

Further it takes the encryption of the in and outgoing amounts as input, i.e. C, D, $\overline{C}$. Then the bulletproof protocol is run as described above. The $\Sigma$ then also takes in T the commitment to t(X) as well as an opening of it at the challenge x: $(\hat{t}, \tau)$. The protocol Note that it is important that the $\Sigma$ protocol is run after the Bulletproofs protocol. In the non-interactive variant this means that the whole Bulletproofs transcript is also hashed in order to generate the $\Sigma$ protocol challenge.

$$\{(y,\bar{y},C_{L,n},C_{R,n},C,D,\overline{C},z,\hat{t},\delta(y,z),\Sigma;sk,b^*,b',r): \\ C=g^{b^*}y^r \wedge \overline{C}=g^{b^*} \\ \bar{y} \wedge D=g^r \wedge C_{L,n}=g^{b'}C_{R,n}{}^{sk}\wedge g^{sk}=y \wedge \hat{t}=\hat{t}-- \\ \delta(y,z) \wedge g^{t-b^*\cdot z^2-b'\cdot z^3}h^\tau=T_{1,2}\} \quad (10)$$

---

| Prover(sk, r, b*, b'') | Verifier |
|---|---|
| $k_{sk}, k_r, k_b \leftarrow \$\mathbb{Z}_q$ | |
| $A_y = g^{k_{sk}}$ | |
| $A_D = D^{k_r}$ | |
| $A_b = g^{k_b} D^{k_{sk}z^2} C_{R,n}^{k_{sk}z^3}$ | |
| $A_{\bar{y}} = \left(\frac{y}{\bar{y}}\right)^{k_r}$ | |
| $A_t = g^{-k_b}$ | |
| $A_y, A_D$ | |
| $A_b, A_{\bar{y}}, A_t$ | |
| $\longrightarrow$ | |
| | $c \leftarrow \$\mathbb{Z}_q$ |
| | $\longleftarrow c$ |
| $s_{sk} = k_{sk} + csk$ | |
| $s_r = k_r + cr$ | |
| $s_b = k_b + c(b^*z^2 + b'z^3)$ | $s_{sk}, s_r, s_b$ |
| $\longrightarrow$ | |

Check the following:
$g^{s_{sk}} = A_y y^c$
$g^{s_r} = A_D D^c$ $$g^{s_b} = \left(\frac{C^c}{D^{s_{sk}}}\right)^{z^2} \left(\frac{C_{L,n}}{C_{R,n}^{s_{sk}}}\right)^{z^3}$$

$$\left(\frac{y}{\bar{y}}\right)^{s_r} = A_{\bar{y}} \left(\frac{C}{\overline{C}}\right)^c$$

$$g^{\hat{t}\cdot c - s_b} h^{\tau \cdot c} = A_t T_{1,2}^c$$

---

Proof Sketch

The protocol is honest verifier zero knowledge because there exists a simulator that can simulate verifying transcripts without access to the witness. The simulator generates a random challenge c and random $s_{sk}, s_r, s_b$. He then computes $A_y, A_D, A_b, A_{\bar{y}}$ and $A_t$ according to the verification equations. Note that they will be identically distributed to the honestly generated ones.

The extractor rewinds the sigma protocol once to receive two accepting transcripts with different challenges and the same first message. Let $c_2, S_{sk}, s_r, 2, s_b, 2$ be the second transcript. From them he computes $$sk = \frac{s_{sk} - s_{sk,2}}{c - c_2}, r = \frac{s_r - s_{r,2}}{c - c_2}, b = \frac{s_b - s_{b,2}}{c - c_2}.$$

From the verification equations it can be deduced that $$y = g^{sk}, D^r, g^b = \left(\frac{C}{D^{sk}}\right)^{z^2} \left(\frac{C_{L,n}}{C_{R,n}^{sk}}\right)^{z^3}$$

and that $g^{\hat{t}} = g^{sk}$, $D^r$, $g^{b+\delta(y,z)}T_{1,2}$. In order to extract b* and b' the whole $\Sigma$-Bullets protocol is rewound twice to get three executions with different zs: $(z_1, z_2, z_3)$. Using the same extraction procedure for the $\Sigma$-protocol, the extracted witnesses $(sk_i, r_i, b_i)$, $i \in \{1,2\}$ are obtained. First note that $sk_1 = sk_2$ since $g^{sk_1} = g^{sk_2} = y$. The following equations can then be formed:

$$g^{b_1} = \left(\frac{C}{D^{sk}}\right)z_1^2 \left(\frac{C_{L,n}}{C_{R,n}^{sk}}\right)z_1^3$$

$$g^{b_2} = \left(\frac{C}{D^{sk}}\right)z_2^2 \left(\frac{C_{L,n}}{C_{R,n}^{sk}}\right)z_2^3$$

One can now easily find a linear combination of these equations to compute b* such that $$g^{b^*} = \frac{C}{D^{sk}}$$

and b' such that $$g^{b'} = \frac{C_{L,n}}{C_{R,n}^{sk}}.$$

This shows that a witness (sk, b*, b', r) can be extracted that the statement $(y, \bar{y}, C_{L,n}, C_{R,n}, C, D, \overline{C}, z, \hat{t}\delta(y, z), \tau; sk, b^*, b', r)$ is in Eq (10).

Signatures

Zether not only uses zero-knowledge proofs but also heavily relies on signatures. Instead of instantiating a separate signature scheme, the zero-knowledge proofs can be leveraged to also provide signature functionality. The ZK-proofs in Zether are derived from interactive proof and then transformed to non-interactive proofs using the Fiat-Shamir heuristic. The Fiat-Shamir heuristic and its extension to multi-round protocol transform an interactive public-coin proof into a non-interactive proof by generating the verifiers messages from the hash of the transcript. There exists a simple transformation that creates a signature scheme from such a proof system. If the prover shows knowledge of a private key and then appends the message to the transcript before generating the challenge then the proof also acts as a signature. This leads to signatures that can be generated and verified at almost no additional computational cost.

9. Optimizations

Multi-exponentiation is not used in some implementations of Zether. Multi-exponentiations reduce the number of curve operations but do this by splitting up the exponentiation. Multi-exponentiation algorithms assume that a k-bit exponentiation use k curve operations. This is not the case for Solidity however. The gas cost for an exponentiation is independent of the exponents length and curve additions are relatively overpriced to curve multiplications. A curve multiplication is only 80 times more expensive than a curve addition even if the exponent has 256 bits. Therefore, multi-exponentiation would not lower but increase the gas cost.

In another optimization, the inner product argument is rolled out and combined all possible exponentiations into a single large statement. Furthermore, the recursive inner product argument is modified such that it terminates at n=4 instead of n=1. This means that instead of sending scalars a and b, the prover sends the two 4 scalar vectors $[a_1, a_2, a_3, a_4]$ and $[b_1, b_2, b_3, b_4]$. By doing this, the prover has to send 6 more elements in $\mathbb{Z}_p$ but on the other hand saves sending 4 Perdersen hashes which are elements in $\mathbb{G}$. Since Solidity does not support point compression, i.e. points in $\mathbb{G}$ are encoded using 64 bytes and scalars using 32 bytes, this small modification therefore saves 64 bytes in space and also reduces the number of curve exponentiations that need to be done. In total for the ConfTransfer transaction, the elliptic curve operations for the account state manipulations, the $\Sigma$-protocol and the two 32-bit range proofs use 156 curve additions and 154 curve multiplications.

A further optimization concerns the common reference string (CRS). Bulletproofs unlike SNARKs does not use a structured reference string which would require a trusted setup. Nevertheless, it still requires a long linear sized reference string that the verifier needs access to. While the CRS could be generated on the fly this can add over 3.9 million gas to the cost of the transaction. Storing the CRS in the blockchain storage also creates high additional cost as loading a 32 byte word can cost 200 gas. On the other hand, loading a 32 byte code instruction can cost only 3 gas. As such, the generators can be hardcoded into the smart contract. This hardcoding makes the contract-generation more expensive but that is a one-time cost which is amortized over the lifetime of the smart contract.

Another optimization that can be implemented without changing Ethereum applies to the proof verification. Bulletproofs can be batch verified. This means that verifying k proofs is significantly faster than verifying a single proof. If transactions were collected by some service provider, combined into a single transaction, and then sent to the Zether contract, it can significantly reduce the verification cost per proof. However, all transactions in a batch must be valid, because a single invalid transaction will cause the whole verification to fail. Batch verification requires randomness but this randomness can either be sampled from the block header or generated from a hash of the proofs.

10 Applications

Zether's capability to lock funds to other smart contracts can make several common smart contracts more private. Even the basic version of Zether, which is more efficient, can help designers address a number of privacy concerns. Before going into the applications, it is worth noting that the Zether contract does not transfer funds without first checking an appropriate burn or transfer proof, even if the request comes from another smart contract whose rules do not permit illegal transfers. This design decision ensures that the security of Zether only depends on itself and not on any outside smart contract. Even a maliciously written or insecure smart contract cannot cause Zether to misbehave.

10.1 Sealed-Bid Auctions

Auctions are used on Ethereum to sell tokens, resources, etc. Ethereum Name Service (ENS), for example, resolves human-readable names into machine-readable identifiers, such as Ethereum addresses and IPFS content hashes, and other identifiers. ENS allocates names through a Vickrey auction, a type of sealed-bid auction where the highest bidder wins but only pays the value of the second highest bid. A total of 767,750 of such auctions have been initiated as of September 2018.

ENS auctions consist of three stages. First, a user initiates an auction on a name by bidding on the name it wishes to buy. Other people then get three days to place their own bids. Second, everyone reveals their bids over a period of two days. If a bid is not revealed, then the entire amount is forfeited. In the third stage, the highest bidder is awarded the name but only pays the value of the second highest bid.

In the bidding phase, a bidder is supposed to make two API calls. The first call creates a sealed bid by hashing the bid value with a bidder generated secret. The second call submits the committed bid along with a certain amount of ether. ENS suggests that a bidder should deposit more ether than the bid value to disguise the true value of the latter.
Drawbacks One can easily see why this mechanism does not provide good bid privacy. First, the ether deposited reveals an upper bound on the bid value. Second, the bidder may not want to deposit a very large amount of ether (assuming she has it) because, in the best case, the amount remains locked till the end of the bidding phase, and, in the worst case, till the end of the whole bidding process.
Using Zether Zether provides a simple way to deal with these problems.

Bidding phase: To bid b ETH in the bidding phase, a bidder, say B, can transfer b ZTH from her primary Zether account into a new account, and then lock the latter to the auction contract, call it AUC. Thus, the bid value is completely hidden without B having to deposit any extra money to obfuscate it.

Reveal phase: B reveals her bid by sending b and a burn proof to AUC. AUC can check the proof and verify that b is in fact the right value. ZSC may also export the proof checking functionality as an API call. Now, there are three possibilities:

1. If a bid is not revealed in this phase or the revealed value is incorrect, then AUC does not do anything. Bidder's account remains locked. Thus, bidders have a strong incentive to reveal their bid regardless of the outcome.

2. If a new revealed bid is lower, then AUC can simply unlock the bidder's account.

3. If a new revealed bid is highest so far, then AUC unlocks the previous highest bid and stores only its amount.

Final phase: For the winning bid, AUC must only keep the next highest bid, say b*, and release the difference back to the bidder. This can be done through a Transfer transaction. However, since all amounts are public anyway, AUC can also simply burn the whole amount and retain one part (the winner's payment) while refunding the rest to the winner. This prevents AUC from having to create an expensive Transfer transaction and it can utilize the burn proof which was submitted with the bid. For simplicity, ZSC can provide a functionality to split up the burn refund directly.

10.2 Payment Channels

Payment channels are a popular way to avoid the fee and delay associated with on-chain transactions. Two or more parties can set-up a payment channel amongst them by committing to some money up front. They can then send messages to each other offline to keep track of the money they owe each other.

Suppose Bob wants to make small payments to Alice every time she tweets for him. Bob can open a payment channel with Alice with the help of a smart contract, say PC. Bob deposits a certain amount of ETH with PC and sets an expiration date. Whenever Alice tweets, Bob signs the total amount of money he owes to Alice so far, and sends the signature to Alice. At any time, Alice can cash out by sending the latest signature to the contract. PC will pay Alice accordingly and send the remaining balance to Bob.

Drawbacks

The amount of ETH Bob deposits with PC is visible to everyone. Indeed, even Alice does not need to know this amount as long as she is convinced that PC holds enough money to pay her off. Further, when Alice cashes out, everyone can see how much she charges per tweet (since the number of tweets is also public).

Using Zether

Zether can easily be used to create a confidential payment channel. Instead of depositing ETH directly with PC, Bob will lock his Zether account to PC (or as in previous example, transfer some money to a new Zether account and lock that to PC). Whenever Alice tweets, Bob would send a Zether transfer transaction to Alice of the amount that she expects, say b. Alice will check the validity of the transaction and that it indeed transfers b to her.

When Alice wants to cash out, she would send the latest transaction to PC, who will pass it on ZSC. ZSC will process the transfer because it is locked to PC. A transfer also unlocks Bob's account. If Alice never cashes out, PC will just unlock Bob's account after the expiration date. As a result, the payment channel between Alice and Bob remains confidential to others. Furthermore, Alice does not learn the total amount Bob locked into the payment channel.

Using a simple signed counter the proposal can be trivially extended to bi-directional channels which in turn can be used to build payment channel networks. With a slightly more involved design adding more funds to a channel can be achieved. Suppose Bob wants to add more ZTH to his account. He prepares a transaction for PC and then lets Alice sign the transaction. He then forwards the transaction and the signature to PC which checks both and, if valid, submits the transaction to ZSC. Note that Alice needs to sign the transaction because it might invalidate a previous payment channel transfer. Alice will require that Bob give him a new valid Zether transaction with respect to Bob's new balance.

10.3 Stake Voting

A voting process can be open and transparent. A blockchain based solution can provide such benefits but voter privacy becomes a concern. The election is carried out in several stages. In the voting stage, a participant publishes a special encryption of their vote $v_i$ and a ZK-proof that $v_i$ is binary. In the tally stage, the votes can be summed up to compute the final tally. The encryption scheme is designed in such a way that only the final tally can be computed—individual votes remain private.

A natural question is whether votes can carry weights, instead of just being zero or one. For instance, participants may cast votes of size proportional to their assets, without revealing the value of those assets. Zether provides a simple way to achieve this. In the sign-up phase of the election, participants will lock their Zether account to the voting smart contract. Then, during the voting stage, when a participant casts a vote $v_i$ (in an encrypted form), he/she will provide a ZK-proof that $v_i$ is equal to the (encrypted) amount in his/her locked account.

10.4 Privacy-Preserving Proof-of-Stake

Proof-of-stake (PoS) is a consensus mechanism for blockchains, where a participant is elected as a leader with a probability that is proportional to the amount of coins that the participant stakes in the election. Users stake a number of coins and then a random beacon is used to select one or a subset of them as leaders.

Zether can make the PoS election process confidential such that users do not have to reveal their stake in order to participate in the election. Similar ideas could be used to implement PoS for other confidential currencies such as ZCash or Monero. Users encrypt an initial lottery ticket t under their public key and stake an encrypted Zether balance b under the same key. Then the random beacon value is used to derive a lottery drawing v. If v falls between t and t+b then the user wins the lottery (e.g., the PoS election). The user can use a range proof to prove that v is in fact between t and t+b without revealing t or b. This range proof is similar to the one used in basic Zether's Transfer.

It is further possible to adjust the winning probability by scaling the range appropriately. Let p denote the desired probability of winning for a single unit of stake. Let q be the size of the ring in which the ElGamal encrypted values lie. For simplicity assume that p·q is an integer. A users wins if v falls in between t and t+b·p·q. This happens with probability b·p.

The hidden lottery approach does not guarantee that at least one user wins. In order to guarantee this, a series of lottery drawings can be done by utilizing a hash function $\mathcal{H}$ that is modeled as a random oracle. For beacon v, $v_i = \mathcal{H}(v\|i)$ is defined as a sequence of lottery drawings. The user who can demonstrate a winning ticket on the lowest drawing wins. To ensure that exactly 1 participant wins, the lottery drawings are uncorrelated by appending the serialized public key pk when computing the lottery drawings, e.g., $v_i = \mathcal{H}(v\|i\|pk)$. Even a malicious user will not be able to correlate lottery tickets for distinct public keys, if $\mathcal{H}$ is in fact a random function. Run-off lottery elections can then be used between the previous winners until a single winner remains.

After multiple drawings an adversary may be able to estimate a user's stake by simply observing the user's probability of winning. This can be circumvented by having a user prove in zero-knowledge that she knows a winning ticket instead of revealing it. A similar ZK-proof can be used as the anonymous Zether transfer. The user proves that she knows a private key which won the lottery instead of revealing her stake. A similar nonce protection as for the anonymous transfer can be used to prevent that a user claims the same winning lottery ticket twice.

11 Correctness

The following section provides a formal description of the correctness property.

Honestly-Generated Transactions

Let $TX=(TX_1, TX_2, \ldots, TX_m)$ be a group of transactions such that for every $i \in [m]$, $TX_i = (tx_{i,1}, tx_{i,2}, \ldots)$ is a sequence of transactions which are processed in that order into the block at height $h_i$ ($h_1 < h_2 < \ldots < h_m$). Define the k-th transaction in TX to be the k-th transaction in the sequence $(tx_{1,1}, tx_{2,1}, \ldots, tx_{2,1}, tx_{2,2}, \ldots, \ldots, tx_{m,1}, tx_{m,2})$. These transactions were generated honestly if all of the following are true:

All secret key, address pairs are generated through the CreateAddress algorithm.

For all i, j, $tx_{i,j}$ is generated by running one of the five user algorithms for generating transactions.

For any $TX_{i_1}$, $TX_{i_2}$, ... s.t. $h_{i_1}$, $h_{i_2}$, ... are in the same epoch, and any pk, $TX_i$ contains at most one transfer or burn transaction (not one of each) initiated from pk.

For any $tx_{i,j}$, if hi is in epoch e then the state after the last block of epoch e−1 was used to generate $tx_{i,j}$ (if a state is needed at all).

Recall that honest users are supposed to publish transfer, burn and lock transactions only at the beginning of an epoch. Thus, the last point above implies that even if there is some delay in processing the transaction, it is no more than the epoch length. In other words, all transactions generated for a certain epoch are assumed to be processed in the same epoch.

For a block height h, let last(h) denote the height of the last block in the previous epoch, i.e. last(h)=$\lfloor h/E \rfloor \cdot E - 1$, and next(h) denote the height of the first block in the next epoch, i.e. next(h)=$\lfloor (h+1)/E \rfloor \cdot E$.

Ideal State

The ideal state IdSt consists of two tables Bal and Lk indexed by addresses. For a public key pk, Bal[pk] gives the balance in pk and Lk[pk] gives the locking Ethereum address (or $\perp$ if pk is not locked). Initially, Bal[pk] and Lk[pk] are set to 0 and $\perp$, respectively, for all pk. These tables are updated as each new transaction is processed. The notations $Bal_h$ and $Lk_h$ are used to denote the state of these tables when all the transactions included in blocks 0, 1, . . . h, have been processed.

Ideal state for a set of transactions TX is defined recursively. Let okToOperate be a function that given a public key pk and an Ethereum address addr, returns 1 if Lk[pk] is pk or $\perp$. (In either case, addr is allowed to operate on the account.) Let $IdSt_k$ denote the ideal state after the first k transactions have been processed. $IdSt_0$, ideal state at the beginning, is set to be the initial state of Bal and Lk tables. $IdSt_k$ is defined based on $IdSt_{k-1}$ and the kth transaction as follows. If the kth transaction $tx_{i,j}$ is:

$tX_{fund} \leftarrow$ CreateFundTx(pk, amt): if the sum of all balances and amt is at most MAX, and okToOperate(pk, $tx_{fund}$·addr)=1, then Bal[pk] is incremented by amt.

$tx_{trans} \leftarrow$ CreateTransferTx($sk_{from}$, $pk_{to}$, AnonSet, amt, $st_{last(h_i)}$): if
for every pk∈AnonSet, okToOperate(pk, $tx_{trans}$·addr)=1, and
$Bal_{last(h_i)}[pkOf(sk_{from})] \geq$ amt,
then $Bal[pkOf(sk_{from})]$ is decremented by amt and $Bal[pk_{to}]$ is incremented by amt.

$tx_{lock} \leftarrow$ CreateLockTx(sk, addr): if okToOperate(pk, $tx_{lock}$·addr)=1 then $Lk_{next(h)}[pk]$=addr.

$tx_{unlock} \leftarrow$ CreateUnlockTx(pk): if OkToOperate (pk, $tx_{unlock}$·addr)=1 then $Lk_{next(h)}[pk]=\perp$.

$tx_{burn} \leftarrow$ CreateBurnTx(sk, amt, $st_{last(h_i)}$): if okToOperate (pk, $tx_{burn}$·addr)=1 and $Bal_{last(h_i)}[pk] \geq$ amt, then decrement Bal[pk] by amt.

(If in any of the above cases, pk is not defined, then it must be taken to mean pkOf(sk).)

Correctness

A transaction mechanism is "correct" if for every group of transactions TX, whenever $tx_{i,j}$ is a burn transaction $tx_{burn}$= (pk, amt, . . . ), Burn($tx_{burn}$)·ETH is same as $Bal_{last(h_i)}$ [pk]. (Recall that Burn($tx_{burn}$)·ETH is the amount of Ether sent back to the user who called Burn with $tx_{burn}$.) Furthermore, for every sk and h, ReadBalance(sk; $st_h$) returns $Bal_{last(h)}$[pkOf(sk)].

12 Security Requirements

This section will describe the security requirements formally as two versions of a security game. The basic version is referred to as Security-Game. All the entities (Chal, Adv and $\mathcal{O}_{SC}$) in the game receive the security parameter $\lambda$ as input. When $\mathcal{O}_{SC}$ receives a transaction from Chal or Adv, it adds the transaction to the queue of pending transactions. At any time, Chal can get the latest state of SC (or any older state) through $\mathcal{O}_{SC}$. Adv has full view of the oracle: it can see all the transactions sent by Chal to SC, how the state of SC changes, etc.

Adversary's Influence on the Contract

Adv is allowed to control the state of SC in one of the following ways:

1. It can instruct Chal to run one of the user algorithms with certain inputs and send the resulting transaction (if any) to $\mathcal{O}_{SC}$ from an Ethereum address of its choice. Example instructions are (addr, CreateAddress), and (addr, CreateFundTx, pk, amt). Note that:

For a CreateAddress instruction, Chal sends the address output by this algorithm—but not the secret key—directly to Adv.

For transactions that require a secret key under the possession of Chal as an input, Adv specifies the corresponding public key instead.

When Chal receives an instruction, it uses the state of SC in the last block of the previous epoch (if needed) to execute the instruction.

If Chal has generated a transfer or a burn transaction in an epoch with a certain public key, then instructions to generate any one of these two transactions again from the same public key in the same epoch will be rejected. Chal will also reject transfer instructions that require it to use accounts locked to different addresses in the anonymity set. (This point and the one before are important because Chal models honest parties in the system.)

2. It can directly send an arbitrary transaction to $\mathcal{O}_{SC}$.

3. It can ask $\mathcal{O}_{SC}$ to process an arbitrary (non-empty) subset of the pending transactions and update the state of SC. This captures the addition of a new block to the blockchain.

The game stops when Adv so desires. Let h* be the height of the last block. Let ADDR denote the set of public keys generated by Chal (at the behest of Adv). Adv does not have the secret keys for them.

12.1 Overdraft-Safety

Overdraft-safety is described by means of a game called Overdraft-Safety-Game between a challenger Chal, an adversary Adv and the oracle $\mathcal{O}_{SC}$, who interact in the exact same way as Security-Game. The following quantities are associated with the game with respect to Adv:

EtherDeposited. Denotes the sum of all $tX_{fund}$·ETH for which $(tx_{fund})$=(pk, . . . ) is such that pk∉PK.

ZetherReceived. Let in be the sum of all $tX_{fund}$·ETH for which $(tx_{fund})$=(pk, . . . ) is such that pk∈PK. Let honBal=$\Sigma_{pkOf(sk) \in PK}$ ReadBalance(sk, $st_{h*}$) be the total balance of honest parties. (Recall that h* is the height of the last added block before the game ends.) Finally, let out be the sum of all burn($tx_{burn}$)·ETH for which $(tx_{burn})$=(pk, . . . ) is such that pk∈PK. Then ZetherReceived denotes in-out-honBal, which may be negative.

EtherBurnt. Denotes the sum of all burn($tx_{burn}$)·ETH for which burn($tx_{burn}$)=(pk, . . . ) is such that pk∈PK.

A payment mechanism is safe against overdrafts if for all PPT adversaries Adv, the probability that EtherDeposited+

ZetherReceived<EtherBurnt in Overdraft-Safety-Game is negl($\lambda$), where the probability is taken over the coin tosses of Adv and the challenger.

12.2. Privacy

In order to capture the privacy requirement formally, a game called Privacy-Game is defined between a challenger Chal, an adversary Adv and the oracle $\mathcal{O}_{SC}$, who interact in the same way as Security-Game but with one crucial difference. Instead of sending just one instruction to Chal every time, Adv sends two consistent instructions at some point and only one instruction rest of the time (consistency will be defined below). Chal executes the (b+1)-th instruction based on a bit b hidden from Adv, which is chosen randomly in advance. Adv outputs a bit b' at the end of the game as a guess for b. (This is the typical left-or-right setting used for indistinguishability-based definitions.)

Two instructions are consistent if they refer to the same user algorithm and need to be sent from the same Ethereum address. Additionally, if the instructions are for creating a fund transaction, then they are associated with the same public key and amount.

creating a transfer transaction, then
they are associated with the same anonymity set;
the amounts should be at most the value returned by ReadBalance with the respective sender's public key and the state of the last block in the previous epoch;
if any of the receivers is a corrupt party, both instructions have the same receiver and the same amount.

creating a lock transaction, then they are associated with the same public key and Ethereum address.

creating an unlock transaction, then they are associated with the same public key.

creating a burn transaction, then they are associated with the same public key, and ReadBalance with that public key and the state of the last block in the previous epoch returns the same value.

executing ReadBalance, then they must return the same value.

A payment mechanism is private if for all PPT adversaries Adv, the probability that b'=b in Privacy-Game is ½+negl ($\lambda$), where the probability is over the coin tosses of Adv and challenger.

13 Security Proof

In this section, a sketch of a security proof of Zether with respect to the correctness and security definitions from above will be described.

Correctness

This section will show that Zether satisfies the correctness definition. Consider a slightly modified version of Zether where RollOver is called on all accounts at the end of each epoch. This only differs from Zether from an efficiency viewpoint as Zether implements lazy roll overs (i.e., every ZSC method rolls over all the accounts it touches in the very beginning of the call). Using this, every honestly generated transaction can be shown to be in fact processed successfully by ZSC.

An honest user uses the state of the last block in the previous epoch to generate transactions. CreateTransferTx and CreateBurnTx roll over all the input public keys based on this state. Thus, any pending transfers associated with these keys are absorbed into the respective accounts and any pending lock requests take effect. Transfer and burn transactions are then generated with respect to this new state of the accounts, which will match with the state ZSC will use to process them (as long as the delay is less than the length of an epoch).

Honest users put only those accounts in their anonymity set that are locked to the same address (if any of them is locked at all). Even if one of the account holders changes the lock on his/her account by calling Lock or Unlock, these methods treat the new locking address (which could be $\perp$) as a pending lock. The lock request will take effect in a subsequent epoch, so transactions generated in this epoch will not be affected.

The rest of the correctness follows from the homomorphic properties of ElGamal encryption as well as the correctness properties of the proof system. Though the encrypted values are in $\mathbb{Z}_p$ and the ideal state handles positive integers, this is not a problem because ZSC takes deposits only up to an amount MAX, a constant much smaller than p. The homomorphic operations, therefore, would not cause an overflow.

Finally, note that a user is able to create a nonce and as such a transaction or burn per epoch unless $\mathcal{G}_{epoch} = \mathcal{G}_{epoch'}$ for epoch≠epoch'. This however happens with at most negligible probability if the hash function $\mathcal{H}$ is collision resistant.

Overdraft-Safety

This section shows that ZSC methods move the right amount of funds to/from accounts by proving that they satisfy certain properties. An inductive argument would then show that Zether is safe against overdrafts.

Consider the method Fund first. Let $(C_L, C_R)$ be the (rolled over) state of an account y. If, hypothetically, Burn is invoked on this state, suppose it returns b ETH. Now Fund is called with b'ETH. If Burn is invoked again (hypothetically), it will return no more than b+b'ETH. Since Burn returns b on the first invocation, it must be that $C_L = g^b C_R^{sk}$ due to the soundness property of ZK-proofs. When b' is deposited, pTransfers is set to (g b', 1). Now when Burn is invoked again, the state of y will either be $(C_L, C_R)$ or $(C_L, C_R) \circ (g^{b'}, 1)$ depending on whether there is a roll over or not. In the first case, only b will satisfy the required relation between $C_L$ and $C_R$, and, in the second case, only b+b' will. So, again due to the soundness property, at most b+b' can be obtained by burning.

Next, consider the method Transfer. Let $(y_1, \ldots, y_n)$ be the anonymity set, $(C_1, D), \ldots, (C_n, D)$ be the ciphertexts, and $\pi_{transfer}$ be the proof for a transfer transaction tx. Let $(C_{L,i}, C_{R,i})$ be the (rolled over) state of the concerned accounts. If Burn is invoked (hypothetically) on these accounts, suppose it returns $b_1 \ldots, b_n$ ETH, respectively. Now if tx is processed successfully by Transfer, then it must be that there exists a j, k and b* s.t. $(C_j, D)$ encrypts $-b^*$ under $y_j$, $(C_k, D)$ encrypts $b^*$ under $y_k$, and rest of the ciphertexts encrypt 0 (due to the soundness property). Transfer sets pTransfers[$y_i$] to be $(C_i, D)$ for all i. Thus, when Burn is invoked again on $y_i$, its state will either be $(C_{L,i}, C_{R,i})$ or $(C_{L,i}, C_{R,i}) \circ (C_i, D)$ depending on whether there is a roll over or not. For the accounts other than $y_j$ and $y_k$, the same amount as before will be returned. For $y_k$, at most $b_k + b^*$ will be returned. Finally, for $y_j$, note that no burning can take place in this epoch because transfer has already declared the nonce. When a burn is processed in the next epoch, there will be a roll over changing the account state to $(C_{L,i}, C_{R,i}) \circ (C_i, D)$. So Burn will return $b_j - b^*$. Therefore, it can be seen that transfer transactions cannot be used to increase the overall Zether balance of the accounts involved. Further note that the nonce along with the soundness of the proof system, enforce that an adversary will at most be able to do a single transfer per account per epoch.

One can similarly analyze the method Burn.

Privacy: Confidentiality & Anonymity

In Privacy-Game, Adv sends one instruction to Chal every time except once, when it sends two consistent instructions. The consistency requirements prevent Adv from trivially winning the game. If the instructions are for funding, locking or unlocking, then it is easy to see that the adversary has no advantage. Two consistent burn instructions will also not reveal any additional information to Adv due to the zero-knowledge property of the proof system.

The case of two consistent transfer instructions is left. A transfer transaction consists of an anonymity set y, a list of commitments C, a blinding value D, a nonce u, and $\pi_{transfer}$. Two consistent transactions could have two different senders, so the nonce values could be different. However, $g_{epoch}^x$ (for any x) is indistinguishable from random under the DDH assumption since both y and $g_{epoch}$ are random (when $\mathcal{H}$ is modeled as a random oracle). Further, ciphertexts ($C_i$, D) for honest i are indistinguishable from the encryption of random messages. Now, let the receivers for the two instructions be j and k. If neither of them are under the control of Adv, then all the ciphertexts Adv can decrypt are just encryptions of 0. Otherwise, both j and k must be corrupt. In this case, Adv can decrypt ($C_j$, D) and ($C_k$, D) too, but then they must decrypt to the same amount.

A computer system will now be described that may be used to implement some of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Some of the software components or functions described in this application, may be implemented as software code to be executed by a processor using a suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A method comprising:
   storing, by a computing device, a set of entries representing a state of a platform smart contract in a blockchain network, the set of entries including at least:
   a first entry comprising a first public key associated with a first account, and a first ciphertext representing a first balance of the first account;
   a second entry comprising a second public key associated with a second account, and a second ciphertext representing a second balance of the second account; and
   a third entry comprising a third public key associated with a third account, and a third ciphertext representing a third balance of the third account;
   locking, by the platform smart contract executing on the computing device, at least the first, second, and third accounts to an application smart contract, wherein the first account is locked in response to receiving a lock request from a user device associated with the first account, the lock request including the first public key, a smart contract address associated with the application smart contract, and a signature generated based on the smart contract address;
   executing, by the computing device, the application smart contract to perform a transaction between the first account and the second account, the transaction causing the first balance to be decremented by a first amount and the second balance to be incremented by the first amount, and the third balance to be updated by a second amount that is different than the first amount;
   unlocking, by the application smart contract executing on the computing device, at least the first, second, and third accounts from the application smart contract; and
   in response to the unlocking of at least the first, second, and third accounts by the application smart contract, the computing device is further programmed for:
   updating the first ciphertext by adding a first operand ciphertext to the first ciphertext, the first operand ciphertext being generated by encrypting a negative of the first amount using the first public key;
   updating the second ciphertext by adding a second operand ciphertext to the second ciphertext, the second operand ciphertext being generated by encrypting a positive of the first amount using the second public key; and
   updating the third ciphertext by adding a third operand ciphertext to the third ciphertext, the third operand ciphertext being generated by encrypting the second amount using the third public key associated with the third account.

2. The method of claim 1, wherein the lock request is received during a particular epoch, and wherein locking of the first account occurs in a subsequent epoch after the particular epoch, each epoch corresponding to a predetermined number of blocks in a blockchain of the blockchain network.

3. The method of claim 1, wherein while the first account is locked to the application smart contract, only the application smart contract is permitted to unlock the first account.

4. The method of claim 1, wherein the transaction decrements the first amount from the first balance, wherein the transaction is stored as a pending transfer transaction of the first account during a particular epoch, and wherein rollover of the pending transfer transaction to the first account occurs in a subsequent epoch after the particular epoch, each epoch corresponding to a predetermined number of blocks in a blockchain of the blockchain network.

5. The method of claim 4, wherein the rollover of the pending transfer transaction is performed in response to receiving a subsequent transaction involving the first account.

6. The method of claim 1, wherein transaction data of the transaction in the blockchain network includes a signature generated based on an epoch base derived from hashing a predetermined string and an epoch number of an epoch during which the transaction is initiated, wherein each epoch corresponds to a predetermined number of blocks in a blockchain of the blockchain network.

7. The method of claim 1, wherein the application smart contract is one of a sealed-bid auction smart contract, a payment channel smart contract, a stake voting smart contract, or a proof-of-stake smart contract.

8. The method of claim 1, wherein the platform smart contract and the application smart contract are written in a cryptocurrency platform programming language.

9. A computing system comprising:
a processor; and
a memory storing executable instructions, which when executed by the processor, causes the computing system to perform operations including:
storing a set of entries representing a state of a platform smart contract in a blockchain network, the set of entries including at least:
a first entry comprising a first public key associated with a first account, and a first ciphertext representing a first balance of the first account;
a second entry comprising a second public key associated with a second account, and a second ciphertext representing a second balance of the second account; and
a third entry comprising a third public key associated with a third account, and a third ciphertext representing a third balance of the third account;
locking, by the platform smart contract, at least the first, second, and third accounts to an application smart contract, wherein the first account is locked in response to receiving a lock request from a user device associated with the first account, the lock request including the first public key, a smart contract address associated with the application smart contract, and a signature generated based on the smart contract address;
executing the application smart contract to perform a transaction between the first account and the second account, the transaction causing the first balance to be decremented by a first amount and the second balance to be incremented by the first amount, and the third balance to be updated by a second amount that is different than the first amount;
unlocking, by the application smart contract, at least the first, second, and third accounts from the application smart contract;
in response to the unlocking of at least the first, second, and third accounts by the application smart contract, the computing system is further programmed for:
updating the first ciphertext by adding a first operand ciphertext to the first ciphertext, the first operand ciphertext being generated by encrypting a negative of the first amount using the first public key;
updating the second ciphertext by adding a second operand ciphertext to the second ciphertext, the second operand ciphertext being generated by encrypting a positive of the first amount using the second public key; and
updating the third ciphertext by adding a third operand ciphertext to the third ciphertext, the third operand ciphertext being generated by encrypting the second amount using the third public key associated with the third account.

10. The computing system of claim 9, wherein the lock request is received during a particular epoch, and wherein locking of the first account occurs in a subsequent epoch after the particular epoch, each epoch corresponding to a predetermined number of blocks in a blockchain of the blockchain network.

11. The computing system of claim 9, wherein while the first account is locked to the application smart contract, only the application smart contract is permitted to unlock the first account.

12. The computing system of claim 9, wherein the transaction decrements the first amount from the first balance, wherein the transaction is stored as a pending transfer transaction of the first account during a particular epoch, and wherein rollover of the pending transfer transaction of the first account occurs in a subsequent epoch after the particular epoch, each epoch corresponding to a predetermined number of blocks in a blockchain of the blockchain network.

13. The computing system of claim 12, wherein the rollover of the pending transfer transaction is performed in response to receiving a subsequent transaction involving the first account.

14. The computing system of claim 12, wherein transaction data of the transaction includes a signature generated based on an epoch base derived from hashing a predetermined string and an epoch number of an epoch during which the transaction is initiated, wherein each epoch corresponds to a predetermined number of blocks in a blockchain of the blockchain network.

15. The computing system of claim 9, wherein the application smart contract is one of a sealed-bid auction smart contract, a payment channel smart contract, a stake voting smart contract, or a proof-of-stake smart contract.

16. The computing system of claim 9, wherein the platform smart contract and the application smart contract are written in a cryptocurrency platform programming language.

17. The method of claim 1, wherein the second amount is a zero amount.

* * * * *